US006965787B2

(12) United States Patent
Kindo et al.

(10) Patent No.: US 6,965,787 B2
(45) Date of Patent: Nov. 15, 2005

(54) HANDS-FREE DEVICE

(75) Inventors: Tsuyoshi Kindo, Sennan-gun (JP); Masaaki Tomoda, Suita (JP); Toshihiko Kurosaki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 410 days.

(21) Appl. No.: 10/262,862

(22) Filed: Oct. 3, 2002

(65) Prior Publication Data

US 2003/0069000 A1 Apr. 10, 2003

(30) Foreign Application Priority Data

Oct. 5, 2001 (JP) ....................................... 2001-309590

(51) Int. Cl.[7] .................................................. H04B 1/38

(52) U.S. Cl. ................................ 455/569.2; 455/575.9; 455/90.3; 379/420

(58) Field of Search ........................... 455/569.2, 569.1, 455/575.9, 90.3, 550.1, 575.1, 575.6, 556.1, 90.2, 345, 351; 370/420; 379/455

(56) References Cited

U.S. PATENT DOCUMENTS 4,042,791 A 8/1977 Wiseman
4,490,842 A 12/1984 Watanabe
4,696,370 A 9/1987 Tokumo et al.
4,797,934 A 1/1989 Hufnagel
5,634,209 A * 5/1997 Prudhomme et al. ....... 455/345
5,974,332 A * 10/1999 Chung ..................... 455/569.2
6,044,161 A 3/2000 Lee
6,089,663 A 7/2000 Hill
6,108,567 A 8/2000 Hosonuma
6,131,042 A * 10/2000 Lee et al. ................ 455/556.1
6,141,432 A 10/2000 Breed et al.
6,148,253 A * 11/2000 Taguchi et al. ............... 701/48
6,505,057 B1 * 1/2003 Finn et al. ............... 455/569.2
6,711,399 B1 * 3/2004 Granier ................... 455/404.1

FOREIGN PATENT DOCUMENTS

DE 43 00 848 8/1993
JP 1-156699 10/1989
JP 4-336800 11/1992
JP 5-092741 4/1993
JP 5-130010 5/1993
JP 6-130973 5/1994
JP 7-087586 3/1995
JP 7-131883 5/1995
JP 7-329639 12/1995
JP 8-289389 11/1996
JP 9-083277 3/1997
JP 2001-037000 2/2001
WO 97/27697 7/1997

* cited by examiner

*Primary Examiner*—Tilahun Gesesse
(74) *Attorney, Agent, or Firm*—Wenderoth, Lind & Ponack, L.L.P.

(57) ABSTRACT

A hands-free device includes a cellular phone of a driver, driver's speakers that output sounds to the driver, front speakers and rear speakers that output sounds widely in a car, a detection unit that outputs a detection signal to indicate whether there is a fellow passenger in the car or not, and control equipment that communicates with the cellular phone. In the case that the control equipment receives a telephone communication voice signal indicating telephone conversation voice of another party of the telephone conversation from the cellular phone, based on the detection signal outputted from the detection unit, when the control equipment judges that there is no fellow passenger, the control equipment has the telephone conversation voice outputted mainly from the front speakers and the rear speakers, and when the control equipment judges that there is a fellow passenger, the control equipment has the telephone conversation voice outputted mainly from the driver's speakers.

35 Claims, 18 Drawing Sheets

HANDS-FREE DEVICE

BACKGROUND OF THE INVENTION

1. Field of the Invention

The present invention relates to a hands-free device that enables a hands-free telephone conversation to take place in a car, and especially to a hands-free device that outputs voice of the other party of a telephone conversation from speakers provided in a car.

2. Description of the Prior Art

Conventionally, a hands-free system that enables a telephone conversation to take place without a driver having a cellular phone in his/her hand (hereafter, a hands-free telephone conversation is used in this sense) is proposed (the Japanese Laid-Open Patent Application No. H5-130010).

FIG. 1 is a diagram that shows a structure of a conventional hands-free system.

The conventional hands-free system shown in FIG. 1 comprises, for example, a driver's cellular phone 90, which the driver brings into a car, and a hands-free device 110 that is installed in the car, communicates with and controls the cellular phone 90, outputs a voice of the other party of a telephone conversation, and transmits the driver's voice to the other party of the telephone conversation.

The hands-free device 110 comprises a communication unit 111 that communicates with the cellular phone 90, a control unit 112 that controls the communication unit 111, a microphone 115 that captures a driver's voice and outputs driver's voice signals indicating the voice, a speaker 113*d* that is set up near the driver's seat 116*a*, a speaker 113*a* that is set up near a front passenger's seat 116*b*, two speakers 113*b* and 113*c* that are set up near a back seat 116*c*, and an amplifier 114 that inputs telephone conversation voice signals indicating the other party's voice of a telephone conversation outputted from the communication unit 111, amplifies the telephone conversation voice signals and outputs them to four speakers 113*a*–113*d*.

The cellular phone 90 comprises a cellular phone main body 91 that can communicate with another telephone and enables the driver to converse by the telephone, and a hands-free communication unit 92 that communicates with the communication unit 111 of the hands-free device 110, controlled by the cellular phone main body 91.

This hands-free communication unit 92 of the cellular phone 90 is connected with the communication unit 111 of the hands-free device 110 wirelessly.

FIG. 2 is a block diagram that shows the functions of the above-mentioned cellular phone main body 91 of the cellular phone 90.

The cellular phone main body 91 comprises, as FIG. 2 shows, a telephone communication unit 91*b* that communicates with another telephone through a telephone line network 613, a cellular phone microphone 91*c*, a cellular phone speaker 91*d*, and main control unit 91*a* that controls the cellular phone microphone 91*c*, the cellular phone speaker 91*d*, and the telephone communication unit 91*b*.

When this cellular phone 90 is not connected with the hands-free device 110, it enables the user of cellular phone 90 to communicate by telephone with the user of another telephone by using the cellular phone speaker 91*d* and the cellular phone microphone 91*c* that are equipped with the cellular phone main body 91.

In other words, the main control unit 91*a* has the cellular phone microphone 91*c* capture the user's voice of the cellular phone 90, and has the telephone communication unit 91*b* transmit signals indicating the voice to another telephone through the telephone line network 613. Then, when the telephone communication unit 91*b* receives the telephone conversation voice signals indicating the other party's voice of the telephone conversation who uses the other telephone, the main control unit 91*a* transmits the telephone conversation voice signals to the cellular phone speaker 91*d*, and has the cellular phone speaker 91*d* output the other party's voice of the telephone conversation.

When a driver brings the cellular phone into a car and connects the cellular phone 90 with the hands-free device 110, the above-mentioned hands-free system comprising the hands-free device 110 and the cellular phone 90, has the microphone 115 of the hands-free device 110 capture the driver's voice, has the speakers 113*a*–113*d* output the other party's voice of the telephone conversation, without the cellular phone microphone 91*c* and the cellular phone speaker 91*d* performing the above-mentioned operations, and enables the driver to make a hands-free telephone conversation.

To be more specific, the telephone communication unit 91*b* of the cellular phone main body 91 is called by the other telephone through the telephone line network 613, and outputs incoming call signals indicating an incoming call to the main control unit 91*a*, which has the hands-free communication unit 92 transmit the incoming call signals to the communication unit 111 of the hands-free device 110.

When the control unit 112 of the hands-free device 110 realizes that the communication unit 111*h* as received the incoming call signals, and inputs from the outside an answering instruction signal that instructs to answer the incoming call, it has the communication unit 111 transmit the answering instruction signal to the hands-free communication unit 92 of the cellular phone 90.

When the main control unit 91*a* of the cellular phone main body 91 realizes that the hands-free communication unit 92 has received the answering instruction signal, it controls the telephone communication unit 91*b* so that the telephone communication unit 91*b* can receive the telephone conversation voice signals transmitted by the other telephone.

Then, the main control unit 91*a* has the hands-free communication unit 92 transmit the telephone conversation voice signals received by the telephone communication 91*b* to the communication unit 111 of the hands-free device 110. The control unit 112 of the hands-free device 110 has the communication unit 111 transmit the telephone conversation voice signals to the amplifier 114. As a result, the four speakers 113*a*–113*d* in the car output the other party's voice of the telephone conversation.

Furthermore, when the control unit 112 of the hands-free device 110 realizes that the communication unit 111*h* as received the incoming call signals and inputs from the outside the answering instruction signal that instructs to answer the incoming call, the control unit 112 has the communication unit 111 transmit the driver's voice signals outputted from the microphone 115 to the hands-free communication unit 92 of the cellular phone 90. The cellular phone main body 91 transmits the driver's voice signals received by the hands-free communication unit 92 to the other telephone through the telephone line network 613.

Thus, under the hands-free device 110 of the conventional hands-free system, the microphone 115 captures the driver's voice, the cellular phone 90 transmits the driver's voice signals indicating the voice to the other telephone, and at the same time, based on the telephone conversation signals received by the cellular phone 90, the speakers 113*a*–113*d* output the other party's voice of the telephone conversation, and the driver can have a hands-free conversation.

However, under the above-mentioned hands-free device 110 of the conventional hands-free system, because the other party's voice during the telephone conversation propagates within the whole body of the car, a fellow passenger hears the voice of the telephone conversation when there is a fellow passenger, and therefore, there is a problem that the privacy of the driver and the other party of the telephone conversation cannot be protected.

Additionally, in order that only the driver hears the telephone conversation, for example, a hands-free device under which a speaker with directional characteristic to the output direction is set up near the driver's seat with the output direction aimed at the driver is proposed (Japanese Laid-Open Patent Application No. H5-92741). However, in this case, in contrast to the above description, because the voice of the other party of the telephone conversation does not propagate within the whole body of the car, the sound quality of the voice during the telephone conversation is poor. When there is a fellow passenger, it cannot be helped from the view point of protecting the privacy, but the driver wants to hear the other party's voice during the telephone conversation with high quality when there is no fellow passenger.

SUMMARY OF THE INVENTION

In view of the foregoing, it is the object of this invention to provide a hands-free device that prevents a fellow passenger from hearing the telephone conversation voice of the other party of the telephone conversation when there is a fellow passenger, to realize the protection of privacy and the preservation of secrecy, and to make it easy for a driver to hear the telephone conversation voice with good sound quality when there is no fellow passenger.

To achieve the above-mentioned object, the hands-free device according to the present invention is a hands-free device for enabling a driver to have a hands-free telephone conversation using a cellular phone in a car comprising: a first speaker to output sound to the driver; a second speaker to output sound widely in the car; a detection unit operable to output a detection signal indicating whether there is a fellow passenger or not; and a control unit operable to communicate with the cellular phone, judge whether there is a fellow passenger or not based on the detection signal outputted from the detection unit, upon receiving a telephone conversation voice signal indicating the telephone conversation voice of the other party of the telephone conversation, have mainly the second speaker output the telephone conversation voice when the control unit judges that there is no fellow passenger, and have mainly the first speaker output the telephone conversation voice when the control unit judges that there is a fellow passenger.

By doing this, when there is a fellow passenger, since the telephone conversation voice is outputted mainly from the first speaker that outputs the sound to the driver, it is possible to prevent the fellow passenger from hearing the telephone conversation voice of the other party and to realize the protection of privacy and the preservation of secrecy. Furthermore, when there is no fellow passenger, since the telephone conversation voice is outputted mainly from a second speaker that outputs sound widely in the car, the driver can hear the telephone conversation voice of the other party of the telephone conversation with good sound quality.

Additionally, it is acceptable that the control unit further has the second speaker output the audio sound when the control unit receives an audio signal indicating the audio sound including at least one of music, radio sound, and TV sound in the case that the telephone conversation voice signals are not received from the cellular phone.

By doing this, in the case that audio apparatus is mounted in the car and the audio apparatus outputs audio signals, since the audio sound is outputted from the second speaker that outputs sound widely in the car, the driver and the fellow passenger can hear the audio sound with good sound quality.

Additionally, it is acceptable that the hands-free device comprises a plurality of second speakers, wherein the control unit prohibits the second speaker that is nearest to the driver's seat among the plurality of second speakers from outputting the audio sound and has the other second speaker output the audio sound when the audio signal is outputted in the car in the case that the control unit receives the telephone conversation voice signals.

By doing this, when the driver has a hands-free telephone conversation while the audio signals are outputted from the audio apparatus mounted in the car, even if the telephone conversation voice of the other party of the telephone conversation outputted mainly from the first speaker flows into the front passenger seat, since the audio signals are outputted by the second speakers other than the second speaker that is nearest to the driver's seat, the telephone conversation voice that flows into the front passenger seat is masked by the audio sounds outputted from the other second speakers, so it is possible not only to prevent the fellow passenger from hearing the telephone conversation but also to reduce the uncomfortable feeling of the fellow passenger by letting the fellow passenger hear the audio sound. Furthermore, since the audio sound output from the second speaker that is nearest to the driver's seat is prohibited, it is possible for the driver to hear the telephone conversation voice outputted mainly by the first speaker without being interfered by the audio sound.

Here, it is acceptable that the hands-free device according to the present invention is a hands-free device for enabling a driver to have a hands-free telephone conversation using a cellular phone in a car comprising: a speaker that outputs sounds widely in a car; a display unit operable to display a letter on a display surface aimed at the driver in response to an inputted signal; a detection unit operable to output a detection signal indicating whether there is a fellow passenger in the car or not; and a control unit operable to communicate with the cellular phone, judge whether there is the fellow passenger or not based on the detection signal outputted from the detection unit, upon receiving telephone conversation voice signals indicating the telephone conversation voice of the other party of the telephone conversation, output the telephone conversation voice from the speaker when the control unit judges that there is no fellow passenger, and output the telephone conversation voice signals to the display unit, which displays the telephone conversation voice in letters when the control unit judges that there is a fellow passenger.

By doing this, when there is a fellow passenger, since the contents of the telephone conversation voice of the other party of the telephone conversation are displayed on a display surface aimed at the driver with letters, it is possible to realize the protection of privacy and the preservation of secrecy. Furthermore, when there is no fellow passenger, since the telephone conversation voice is outputted mainly from a second speaker to output sound widely in the car, the driver can hear the telephone conversation voice of the other party of the telephone conversation with good sound quality.

Additionally, it is acceptable that the hands-free device further comprises a microphone that captures a voice of the driver and outputs voice signals indicating the voice, wherein the control unit transmits the voice signals to the cellular phone when the control unit receives the voice signals from the microphone and, at the same time, erases past letters indicating contents of telephone conversation voice of the other party of the telephone conversation displayed on the display unit.

By doing this, when the driver utters a sound in a hands-free telephone conversation, since the past letters indicating the contents of the telephone conversation voice of the other party of the telephone conversation displayed on the display unit are deleted, the driver can easily see the latest letters.

Furthermore, the present invention can be realized as an output method of the telephone conversation contents, and a program executed by a computer.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT(S)

(The first embodiment)

Hereinafter, a hands-free system according to the first embodiment of the present invention will be explained with reference to the figures.

Figure 3:
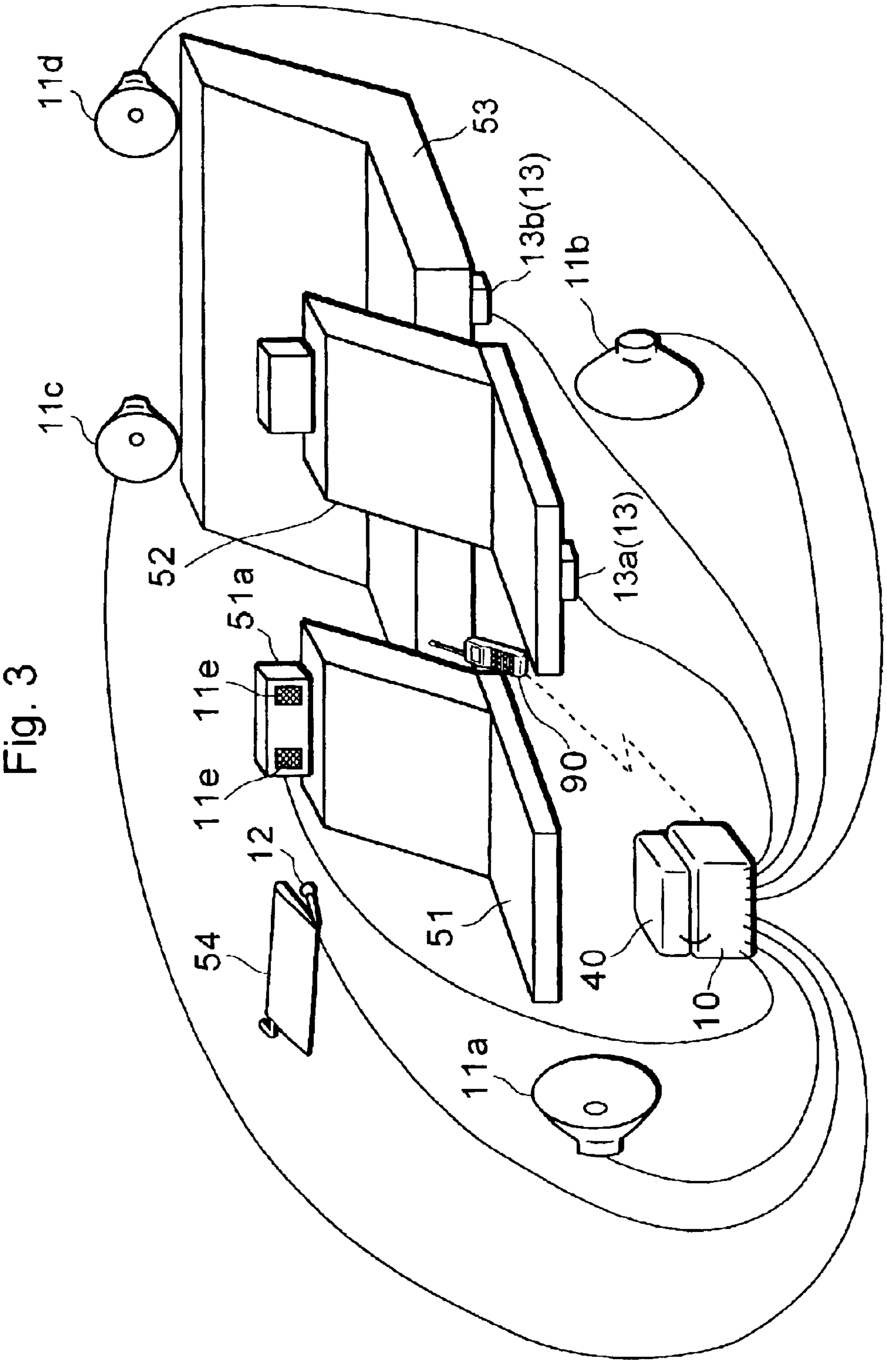
FIG. 3 is a diagram that shows an outline structure of a hands-free system according to the first embodiment of the present invention.

FIG. 3 is a diagram that shows an outline structure of a hands-free system according to the first embodiment of the present invention.

This hands-free system detects whether there is a fellow passenger in the car or not, switches the speakers that output the other party's voice of the telephone conversation according to the detection result, and comprises two front speakers (the second speakers) 11*a* and 11*b* installed at the front of a car, two rear speakers (the second speakers) 11*c* and 11*d* installed at the rear of the car, two driver's speakers (the first speakers) 11*e* buried in the front part of the headrest 51*a* of the driver's seat 51, a microphone 12 that captures the driver's voice, a cellular phone 90 that the driver brings into the car, a detection unit 13 that outputs the detection signal according to whether there is a fellow passenger in the car or not, and a control equipment 10 that communicates with the cellular phone 90 and controls the microphone 12 and the six speakers 11*a*–11*e* based on the communication status with the cellular phone 90 and the detection signal of the detection unit 13.

The front speaker 11*a* is, for example, embedded in the door at the side of the driver's seat 51, and the front speaker 11*b* is embedded in the door at the side of the front passenger seat 52. In other words, the front speaker 11*a* is located near the driver's seat 51, and the front speaker 11*b* is located near the front passenger seat 52.

The rear speakers 11*c* and 11*d* are, for example, installed at both of the right and the left ends respectively of the upper part of the back seat 53.

These front speakers 11*a*, 11*b* and rear speakers 11*c*, 11*d* do not have the directional characteristic for each output direction. When all speakers 11*a*–11*d* output a sound, the sound propagates within the whole body of the car.

The driver's speakers 11*e* each have the directional characteristic for the output direction and are buried in the headrest 51 a so that each output direction faces to the driver's ears when the driver sits on the driver's seat 51*a*. Additionally, the driver's speakers 11*e* are composed to have the output characteristics become almost flat at the frequency from 300 Hz to 3.4 kHz such that the voice is outputted for a person to hear clearly.

The microphone 12 has the directional characteristic to capture the voice from specified directions, and is attached to the sun visor 54 that is in front of the driver's seat 51 with the directional characteristic faced to the driver.

The detection unit 13 comprises two pressure sensors 13*a* and 13*b*, which output the detection signal according to the pressure received. The pressure sensor 13*a* is placed under the front passenger's seat, and the pressure sensor 13*b* is placed under the back seat 53. When a fellow passenger sits on the front passenger's seat, the pressure sensor 13*a* receives pressure by the weight of the fellow passenger, and outputs the detection signal according to the pressure to the control equipment 10. Similarly, when the fellow passenger sits on the back seat 53, the pressure sensor 13*b* receives pressure by the weight of the fellow passenger, and outputs the detection signal according to the pressure to the control equipment 10.

Figure 1:
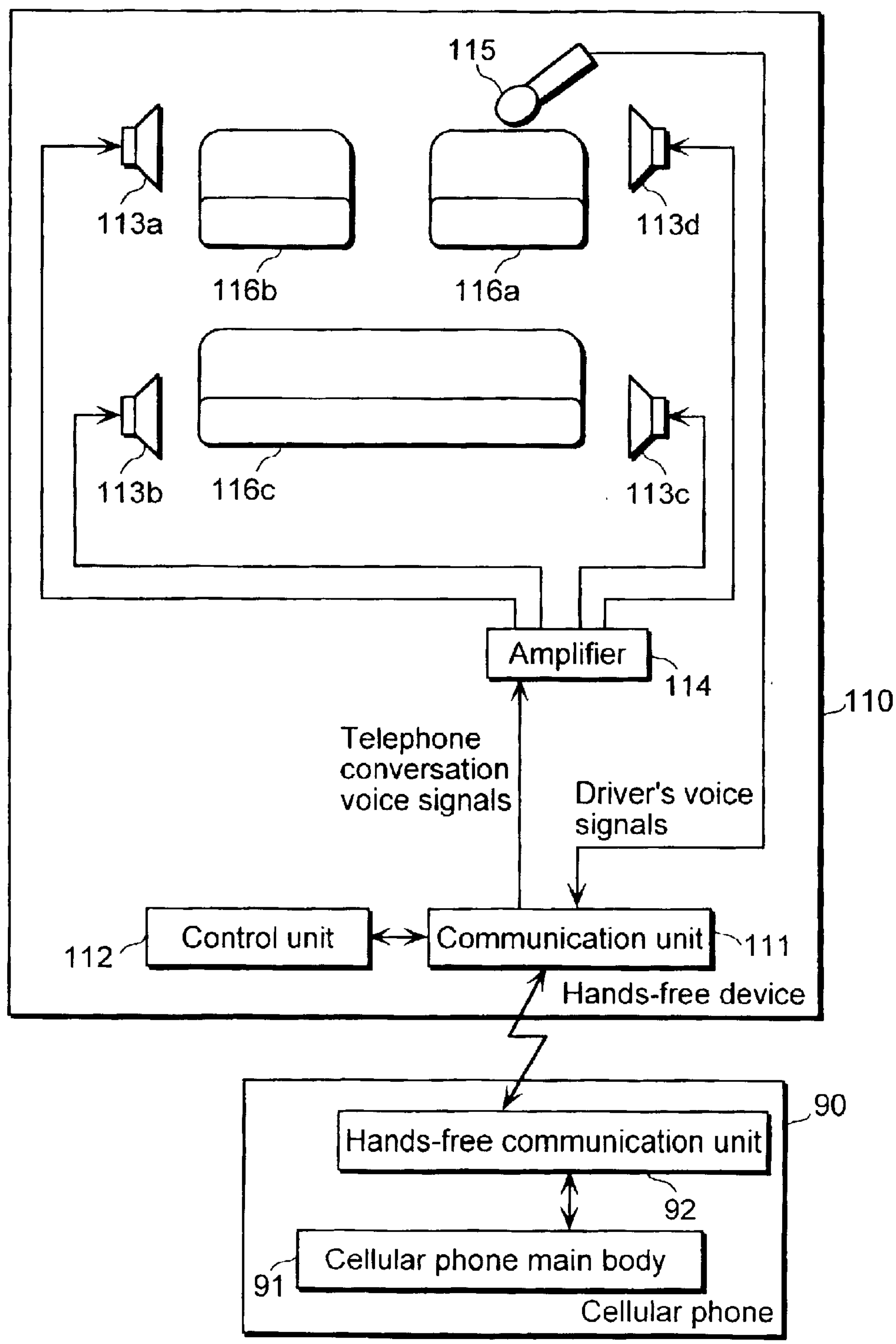
FIG. 1 is a diagram that shows a structure of a conventional example of a hands-free system.
Figure 2:
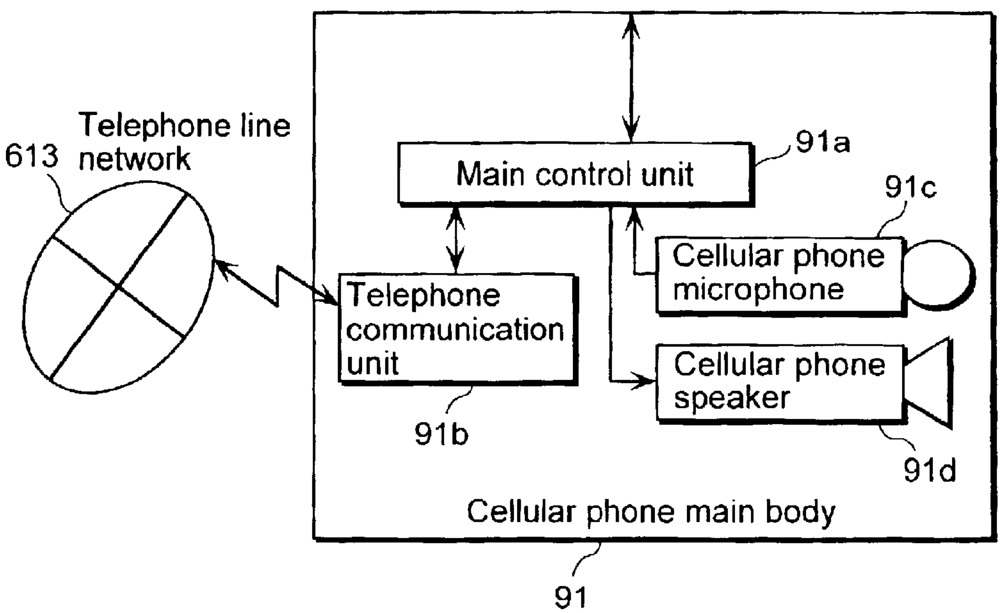
FIG. 2 is a block diagram that shows the functions of the cellular phone main body.

Additionally, the cellular phone 90, like the-cellular phone explained in the conventional example, comprises the hands-free communication unit 92 and the cellular phone main body 91, and the cellular phone main body 91 comprises the main control unit 91*a*, the telephone communication unit 91*b*, the cellular phone microphone 91*c*, and the cellular phone speaker 91*d* as FIG. 1 and FIG. 2 indicate.

The control equipment 10 is integrated into a front panel, a console box and so forth, and has an operation input unit such as operation buttons and so forth. Incidentally, into this control equipment 10, a car navigation device may be integrated.

Additionally, in the car, an audio unit 40 that outputs audio signals indicating audio sounds by reading musical data from such a musical recording medium as CD (Compact Disc) and MD (Mini Disc), and receiving electric waves from a TV and a radio, is integrated, like the control equipment 10, into the front panel, the console box and so forth. Here, the audio sound is at least one of music based on the musical data and the TV sound and the radio sound based on the received electric waves.

The control equipment 10, which is connected with the audio unit 40 electrically, inputs the audio signals outputted by the audio unit 40, and based on the audio signals, outputs the audio sounds from some or all of the front speakers 11*a*, 11*b* and the rear speakers 11*c*, 11*d*.

Figure 4:
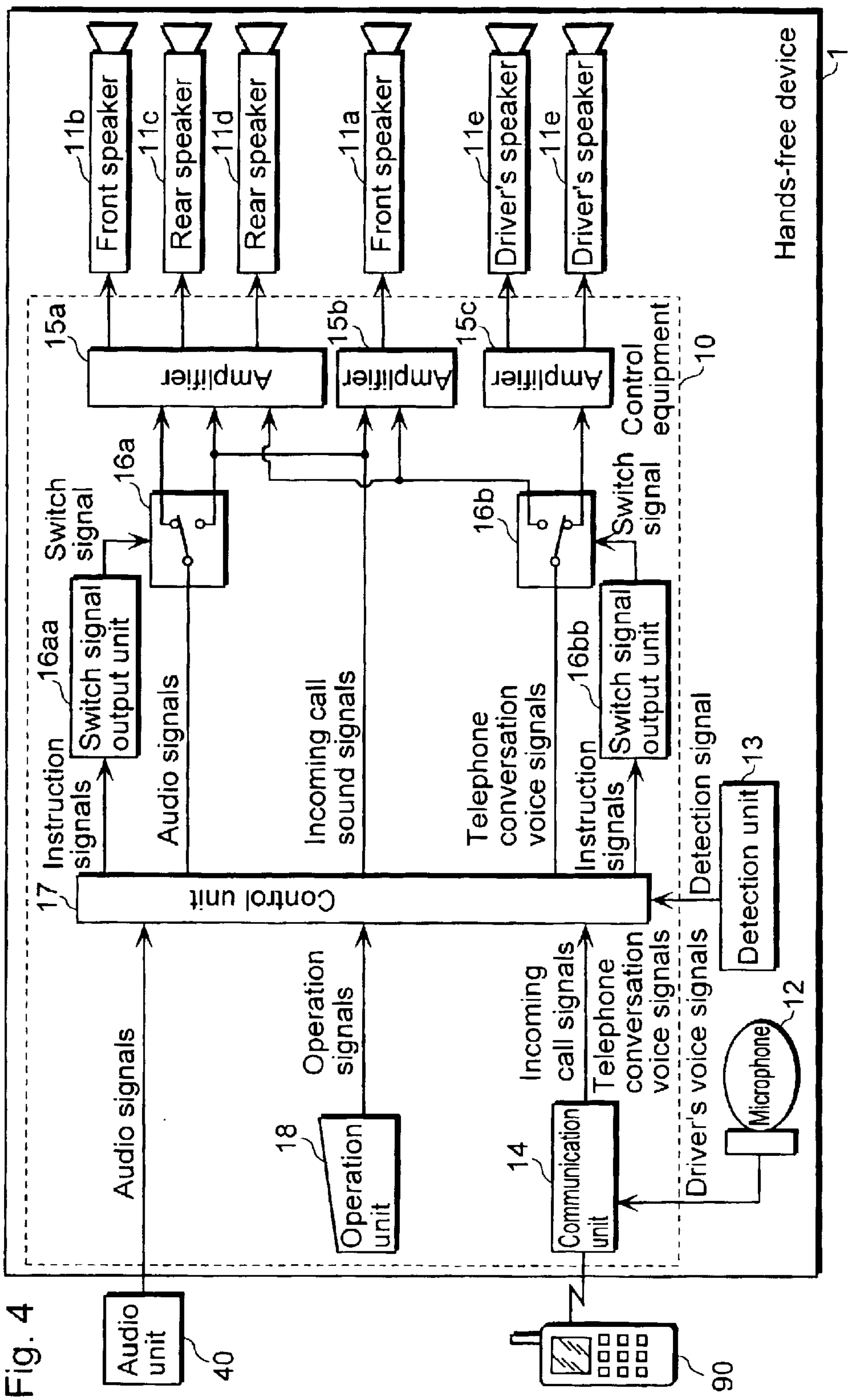
FIG. 4 is a diagram that shows a structure of the hands-free system.

FIG. 4 is a diagram that shows a structure of a hands-free system 1 according to the present embodiment.

According to the present embodiment, the hands-free system 1 comprises the front speakers 11*a*, 11*b*, rear speakers 11*c*, 11*d*, the driver's speakers 11*e*, the microphone 12, the detection unit 13, and the control equipment 10.

The control equipment 10 comprises a communication unit 14 that is a communication interface with the cellular phone 90, an amplifier 15*a* that amplifies the inputted signals and outputs to the front speaker 11*b*, the rear speakers 11*c* and 11*d*, an amplifier 15*b* that amplifies the inputted signals and outputs them to the front speaker 11*a*, the amplifier 15*c* that amplifies the inputted signals and outputs them to the two driver's speakers 11*e*, selector switches 16*a* and 16*b* that output the inputted signals to the selected place to be outputted, switch signal output units 16*aa* and 16*bb* that outputs a switch signal to instruct the selector switches 16*a* and 16*b* respectively to switch the selected place to be outputted, an operation unit 18 that is equipped with the above-mentioned operation buttons and outputs the operation signals according to operations of the operation buttons, and a control unit 17 that controls the switch signal output units 16*aa* and 16*bb* according to the operation signals, the detection signal from the detection unit 13, and an output situation of the audio signals from the audio unit 40.

A communication unit 14 communicates with the hands-free communication unit 92 of the cellular phone 90 through a wireless medium. The communication is done, for example, conforming to the communication standards of Bluetooth (a registered trademark of The Bluetooth SIG Incorporated).

In other words, the cellular phone 90 is compatible with Bluetooth ®. When the cellular phone 90 is brought into the car and comes into the wireless communication area of the communication unit 14, the communication unit 14 establishes a communication link with the cellular phone 90.

To be more specific, the control unit 17 of the control equipment 10 not only communicates conforming to the communication standards of Bluetooth ®, but also has the communication unit 14 broadcast an inquiry command that inquires whether the device has the functions as a cellular phone, according to the operations of the operation buttons of the operation unit 18 by a user (driver). Then the control unit 17 waits for the communication unit 14 to receive a response message that it is the device that not only communicates conforming to the communication standards of Bluetooth ® but also has the functions of a cellular phone. Consequently, when the cellular phone 90 comes into the communication area of the communication unit 14, the hands-free communication unit 92 of the cellular phone 90 receives the above-mentioned inquiry command, the main control unit 91 a of the cellular phone 90 detects the reception, and the main control unit 91*a* has the hands-free communication 92 transmit the response message to the inquiry command to the communication unit 14 of the control equipment 10. As a result, the control unit 17 of the control equipment 10 detects that the response message has been received by the communication unit 14, receives an operation signal that instructs to connect the communication unit 14 of the control equipment 10 and the hands-free communication unit 92 of the cellular phone 90, and establishes the communication link between the communication 14 of the control equipment 10 and the hands-free communication unit 92 of the cellular phone 90.

Then, when the cellular phone is called by another telephone through the telephone line network 613, in other words, the cellular phone 90 receives an incoming call, as was stated when the conventional example was mentioned, since the hands-free communication unit 92 of the cellular phone 90 transmits the incoming call signals, the communication unit 14 of the hands-free device 1 receives the incoming call signals and outputs the signals to the control unit 17.

Furthermore, when the driver operates a hook button that will be explained later and the status of a cellular phone 90 that receives an incoming call becomes off hook, the communication unit 14 receives from the cellular phone 90 the telephone conversation voice signals indicating the telephone conversation voice of the other party of the telephone conversation, who uses the above-mentioned other telephone, and outputs the telephone conversation voice signals to the control unit 17, and transmits the driver's voice signals indicating the driver's voice captured by the microphone 12 to the cellular phone 90.

The operation unit 18 is equipped with the plural operation buttons as was stated above. To be more specific, it is equipped with such operation buttons as an input button that inputs the telephone number of the telephone used by the other party of the telephone conversation, a transmission button to urge the cellular phone 90 to transmit to the telephone whose numbers are inputted, and a hook button that instruct the cellular phone 90 to change an on hook status to an off hook status and vice versa. When these operation buttons are operated, the operation unit 18 outputs the operation signals in response to the operations of the operation buttons to the control unit 17, which control the cellular phone 90 and so forth based on the operation signals through the communication unit 14.

The selector switch 16*a* inputs the audio signals outputted from the audio unit 40 through the control unit 17 as the input signals and switches the selected place(s) to be outputted from the amplifier 15*a* to the two amplifiers 15*a* and 15*b* and vice versa.

The selector switch 16*b* inputs the telephone conversation voice signals outputted from the communication unit 14 through the control unit 17 as the input signals and switches the selected place(s) to be outputted from the amplifier 15*c* to the two amplifiers 15*a* and 15*b* and vice versa.

When the control unit 17 inputs the incoming call signals from the communication unit 14, the control unit 17 outputs the incoming call sound signals indicating the incoming call to the two amplifiers 15*a* and 15*b*. Additionally, when the control unit 17 inputs the telephone conversation voice signals from the communication unit 14, the control unit 17 outputs the telephone conversation voice signals to the selector switch 16*b*, and also switches the selected place to which the signal of the selector switch 16*b* is outputted to the switch signal output unit 16*bb* in response to the detection signal from the detection unit 13. As a result, the telephone conversation voice is outputted from the front speakers 11*a* and 11*b* and the rear speakers 11*c* and 11*d* or from the two driver's speakers 11*e*.

Figure 5:
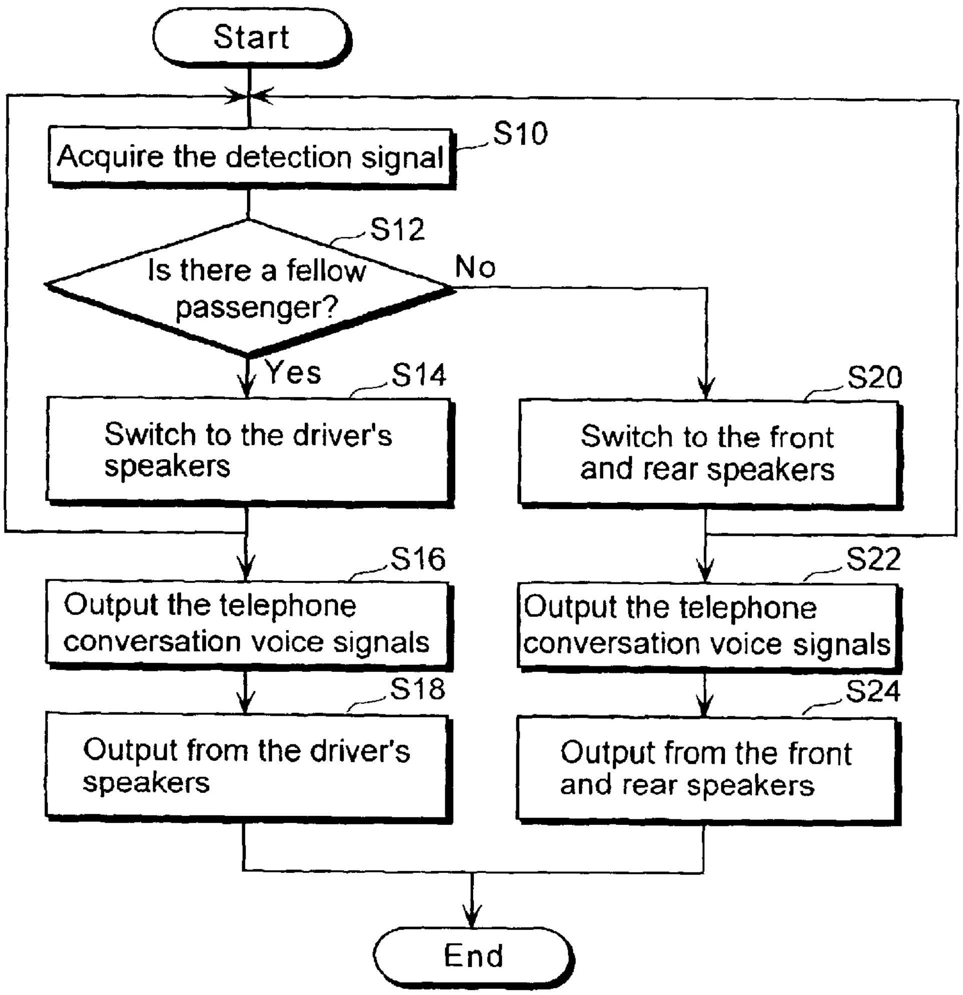
FIG. 5 is a flow chart that shows the operations of the hands-free system.

FIG. 5 is a flow chart that shows the operations of the hands-free system according to the present embodiment.

For a start, the control unit 17 acquires each detection signal from the pressure sensors 13*a* and 13*b* of the detection unit 13 (Step S10). Here, when the control unit 17 realizes that the voltage reading of at least one of the detection signals exceeds the specified value, the control unit 17 judges that there is a fellow passenger on the front passenger seat 52 or the back seat 53 (Yes at Step S12), and outputs to the switch signal output unit 16*bb* an instruction signal to make the amplifier 15*c* the selected place to which the signal of the switch unit 16*b* is outputted. By doing this, the switch signal output unit 16*bb* outputs the switch signal based on the above-mentioned instruction signal, and switches the selected place to which the signal of the switch unit 16*bb* is outputted to the amplifier 15*c*, in other words, the driver's speakers 11*e* (Step S14).

As a result, when the control unit 17 inputs the telephone conversation voice signals from the communication unit 14, the control unit 17 outputs this telephone conversation voice signals to the selector switch 16*b* (Step S16), the driver's speakers lie, which are buried in the headrest 51*a* of the driver's seat 51, and outputs the telephone conversation voice of the other party of the telephone conversation (Step S18).

Additionally, when the control unit 17 acquires the detection signal from each of the pressure sensors 13*a* and 13*b* of the detection unit 13 (Step S10), and realizes that the voltage readings of the two detection signals do not reach the specified value, the control unit 17 judges that there is no fellow passenger on the front passenger seat 52 and the back seat 53 (No at Step S12), and outputs to the switch signal output unit 16*bb* an instruction signal to make the two amplifiers 15*a* and 15*b* the selected places to which the signal of the switch unit 16*b* is outputted. By doing this, the switch signal output unit 16*bb* outputs the switch signal based on the above-mentioned instruction signal, and switches the selected places to which the signal of the switch unit 16*bb* is outputted to the amplifiers 15*a* and 15*b*, in other words, the front speakers 11*a* and 11*b* and the rear speakers 11*c* and 11*d* (Step S20).

As a result, when the control unit 17 inputs the telephone conversation voice signals from the communication unit 14, the control unit 17 outputs the telephone conversation voice signals to the selector switch 16*b* (Step S22), the front speakers 11*a* and 11*b*, and the rear speakers 11*c* and 11*d* which are installed in the front and the rear of the car, and outputs the telephone conversation voice of the other party of the telephone conversation (Step S24).

As was stated above, according to the present embodiments, the control unit 17 controls the switch signal output unit 16*bb* and the selector switch 16*b*. When there is no fellow passenger, the telephone conversation voice from the other party of the telephone conversation is outputted from the front speakers 11*a* and 11*b* and the rear speakers 11*c* and 11*d*, and propagates within the whole body of the car, and the driver can hear the telephone conversation voice with good sound quality. Additionally, when there is a fellow passenger, the telephone conversation voice from the other party of the telephone conversation is outputted from the two driver's speakers 11*e*, which are near the driver's ears, it is possible to prevent from happening the fellow passenger from hearing the telephone conversation voice and to protect the privacy. Additionally, because the driver's speakers 11*e* each have the directional characteristic for the output direction, it is possible to prevent the phenomenon that the sound outputted by the driver's speakers 11*e* is captured by the microphone 12 and the voice of the driver himself is heard from the telephone of the other party of the telephone conversation like an echo. As a result, there is no need to include a device that prevents the phenomenon from happening, for example, a so called echo canceller, in the hands-free system, and therefore it is possible to simplify the system composition and reduce the cost.

Furthermore, when the cellular phone 90 receives an incoming call, the incoming call sounds are outputted from the front speakers 11*a* and 11*b* and the rear speaker 11*c* and 11*d*, and propagate within the whole body of the car. Therefore, when there is a fellow passenger, not only the driver but also the fellow passenger can hear the incoming call sounds clearly. As a result, it is possible to inform the fellow passenger that there is an incoming call and the driver may begin a hands-free telephone conversation.

Here, the operations of the control unit 17 when the audio unit 40 outputs audio signals are explained.

When the communication unit 14 does not output the telephone conversation voice signals and the incoming call signals, the control unit 17, regardless of the detection signal from the detection unit 13, outputs to the switch signal output unit 16*aa* an instruction signal to instruct that the selected places to which the signal from the selector switch 16*a* is outputted should be the two amplifiers 15*a* and 15*b*. By doing this, the switch signal output unit 16*aa* outputs the switch signal based on the above-mentioned instruction signal, and switches the selected places to which the signal of the selector switch 16*a* is outputted to the two amplifiers 15*a* and 15*b*.

As a result, when the control unit 17 inputs audio signals from the audio unit 40, the control unit 17 outputs these audio signals to the selector switch 16*a*, and therefore, the audio sounds based on the audio signals are outputted from the front speakers 11*a* and 11*b* and the rear speakers 11*c* and 11*d*.

Additionally, when the communication unit 14 outputs the incoming call signals while the audio unit 40 outputs the audio signals, the control unit 17 stops outputting the audio signals to the selector switch 16*a*. By doing this, the output from the front speaker 11*a* and 11*b* and the rear speakers 11*c* and 11*d* stop and the incoming call sounds are outputted.

On the other hand, as a result that the hook button of the operation unit 18 is operated, when the status of the cellular phone becomes off hook and the communication unit 14 outputs the telephone conversation voice signals, the control unit 17 acts differently in response to the detection signal.

Namely, when the voltage readings of the detection signals from the both pressure sensors 13*a* and 13*b* are below the specified value, the control unit 17 stops outputting the audio signals to the selector switch 16*a*. By doing this, the output of the audio sounds from the front speakers 11*a* and 11*b* and the rear speakers 11*c* and 11*d* stops, and only the telephone conversation voice of the other party of the telephone conversation is outputted from the front speakers 11*a* and 11*b* and the rear speakers 11*c* and 11*d.*

However, when the voltage reading of the detection signal from at least one of the two pressure sensors 13*a* and 13*b* exceeds the specified value, the control unit 17 outputs to the switch signal output unit 16*aa* the instruction signal to instruct that the selected place to which the signal from the selector switch 16*a* is outputted should be the amplifier 15*a*. By doing this, the switch signal output unit 16*aa* outputs the switch signal based on the above-mentioned instruction signal, and switches the selected place to which the signal of the selector switch 16*a* is outputted to the amplifier 15*a.*

As a result, the audio sounds based on the audio signals are outputted from the front speaker 11*b* and the rear speaker 11*c* and 11*d*, and at the same time, the telephone conversation voice of the other party of the telephone conversation is outputted from the two driver's speakers 11*e*, which are buried in the headrest 51*a*, as was stated above.

Namely, while the status of the audio unit 40 is on and there is a fellow passenger, when the driver makes a hands-free telephone conversation, because the telephone conversation voice of the other party of the telephone conversation is outputted from the driver's speakers 11*e*, which are near the driver's ears, and at the same time, the audio sounds are outputted from the front speaker 11*b*, which is distant from the driver, and the rear speakers 11*c* and 11*d*, even if the telephone conversation voice flows into the front passenger seat, the voice is masked by the audio sounds outputted from the front speaker 11*b* and the rear speakers 11*c* and 11*d*, which further prevents the fellow passenger from hearing the telephone conversation voice. Additionally, among the front speakers 11*a* and 11*b* and the rear speakers 11*c* and 11*c*, the front speaker 11*a*, which is the closest to the driver's seat 51, stops outputting the audio sounds, which prevents the driver from having a hard time listening to the telephone conversation voice.

Here, the above-mentioned operations will be explained in brief with reference to FIG. 6.

Figure 6A:
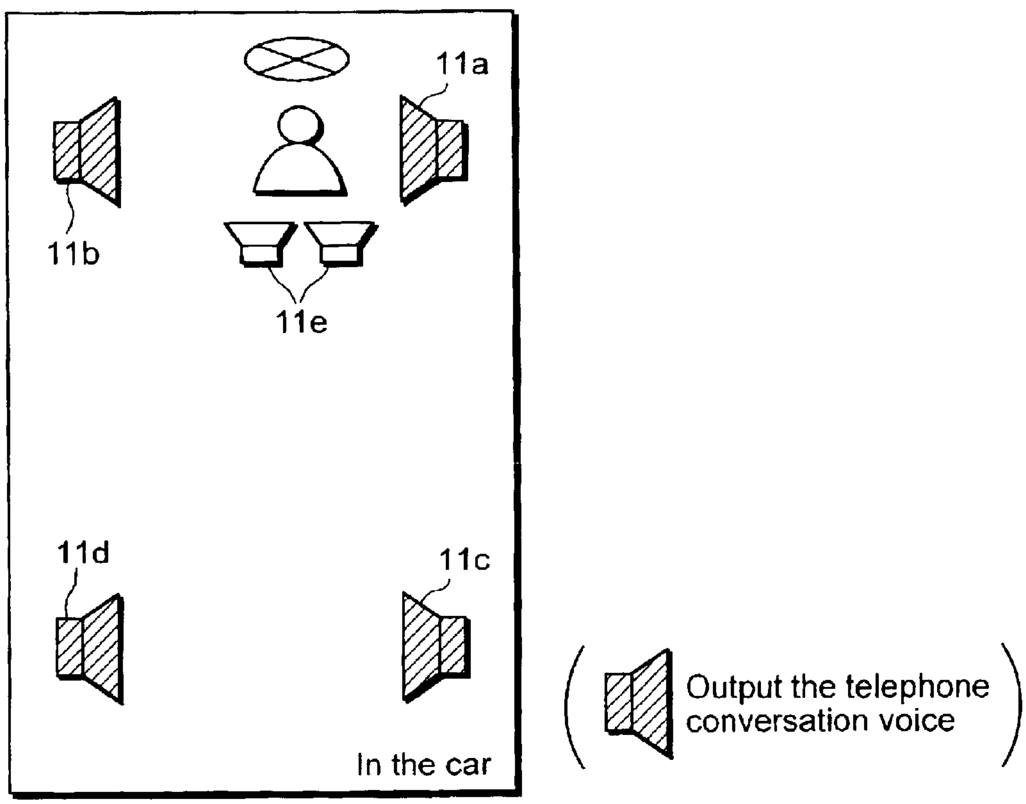
FIG. 6A is an explanatory diagram that explains the output situation of the speakers of the hands-free system when there is no fellow passenger.
Figure 6B:
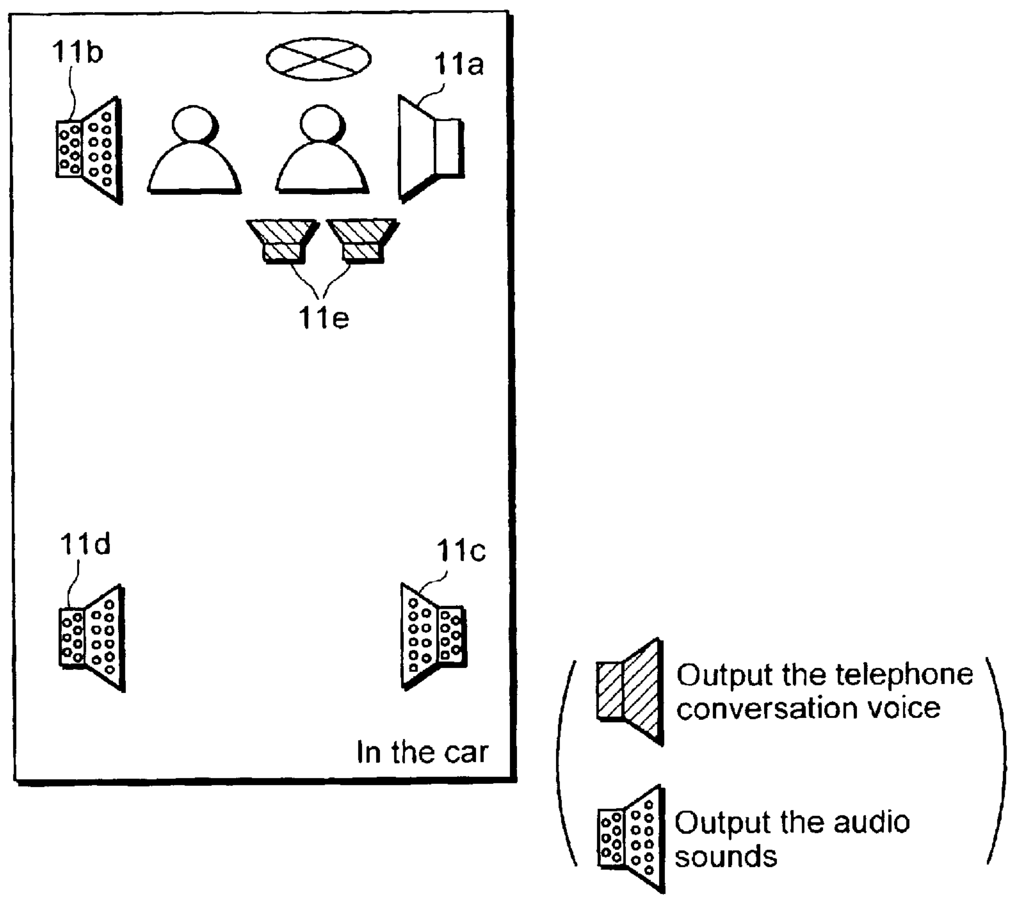
FIG. 6B is an explanatory diagram that explains the output situation of the speakers of the hands-free system when there is a fellow passenger.

FIGS. 6A and 6B are explanatory diagrams that explain the output situation of the situation of the front speakers 11*a* and 11*b*, the rear speakers 11*c* and 11*d*, and the driver's speaker 11*e* while the status of the audio unit 40 is on and when the driver makes a hands-free telephone conversation. FIG. 6A is an explanatory diagram when there is no fellow passenger, and FIG. 6B is an explanatory diagram when there is a fellow passenger.

As was stated above, while the status of the audio unit 40 is on, the cellular phone 90 has no incoming call, and the status of the cellular phone 90 does not become off hook, the audio sounds based on the audio signals are outputted from the front speakers 11*a* and 11*b* and the rear speakers 11*c* and 11*d*.

However, while the status of the audio unit 40 is on, when the status of the cellular phone 90 becomes off hook and a hands-free telephone conversation is made, when there is no fellow passenger on the front passenger seat 52, the telephone conversation voice of the other party of the telephone conversation is outputted from the front speakers 11*a* and 11*b* and the rear speakers 11*c* and 11*d* as FIG. 6A shows.

By doing this, the driver can hear the telephone conversation voice of the other party of the telephone conversation with good sound quality.

On the other hand, when there is a fellow passenger on the front passenger seat 52, while the status of the audio unit 40 is on, when the status of the cellular phone 90 becomes off hook and a hands-free telephone conversation is made, as FIG. 6B shows, the front speaker 11*b* and the rear speakers 11*c* and 11*d* output the audio sounds based on the audio signals, the telephone conversation voice of the other party of the telephone conversation is outputted from the two driver's speakers 11*e*, and the voice output from the front speaker 11*a* stops.

By doing this, the driver can easily hear the telephone conversation voice of the other party of the telephone conversation, and at the same time, the fellow passenger has a hard time hearing the telephone conversation voice.

Next, a variant of the hands-free system according to the present embodiment will be explained.

For a start, a variant example of the detection unit 13 will be explained.

Figure 7:
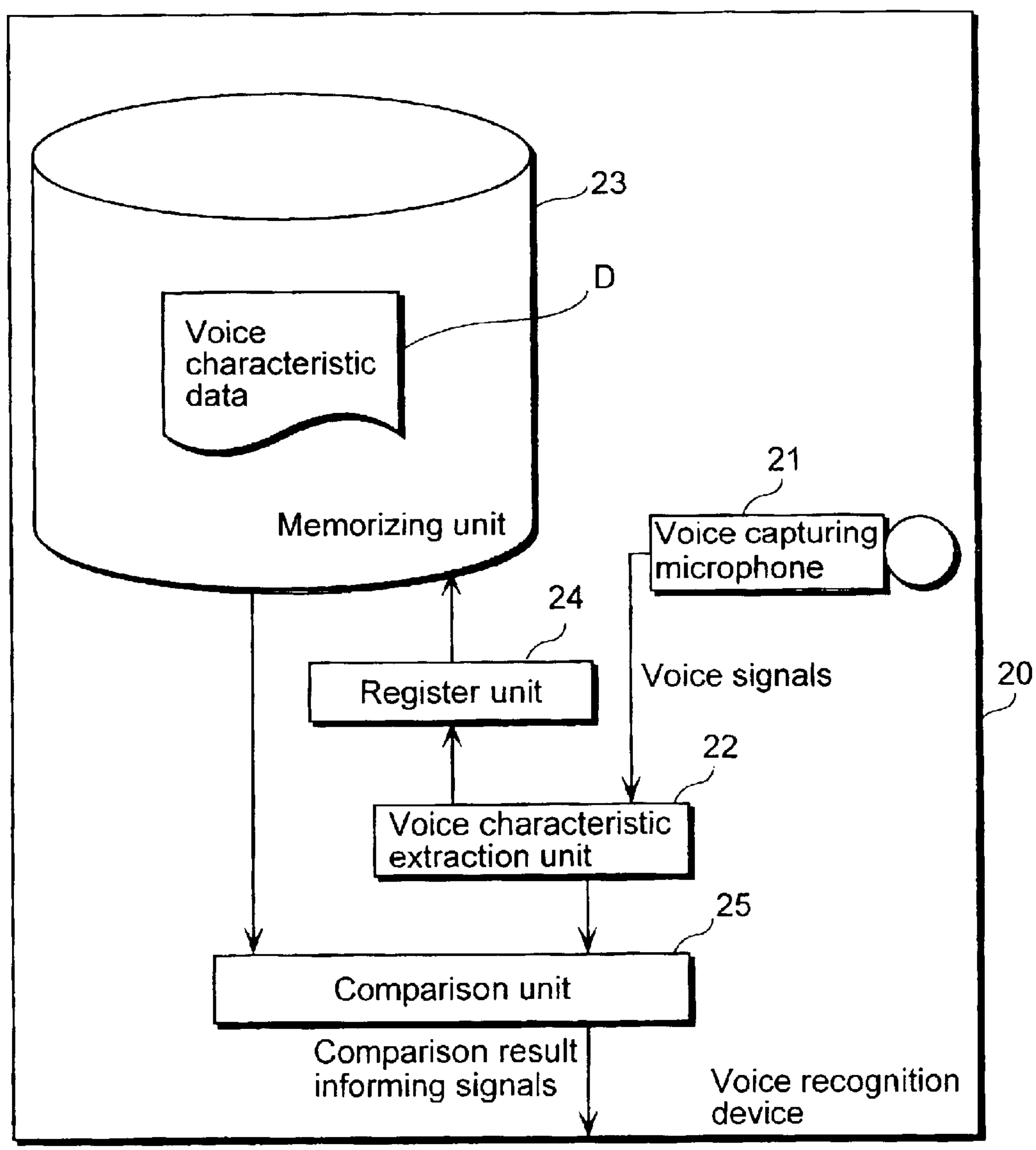
FIG. 7 is a block diagram that shows the functions of a variant of a voice recognition device.

FIG. 7 is a diagram that shows the inner structure of the voice recognition device 20.

According to the present embodiment, the hands-free system includes the detection unit 13 comprising the pressure sensor 13*a* and 13*b*, the hands-free system according to the variant includes the voice recognition device 20 that captures the propagated voice within the car and recognizes whether the voice is the driver's voice or not instead of this detection unit 13.

As FIG. 7 shows, this voice recognition device 20 comprising: a voice capturing microphone 21 that captures the voice propagated in the car and outputs voice signals; a voice characteristic extraction unit 22 that, based on the voice signals outputted from the voice capturing microphone 21, extracts a characteristic wave form and spectrum and outputs the extracted characteristic wave form and spectrum as voice characteristic data D; a memorizing unit 23 that memorizes the voice characteristic data D; a register unit 24 that registers the voice characteristic data D outputted from the voice characteristic extraction unit 22 in the memorizing unit 23; and a comparison unit 25 that compares the voice characteristic data D memorized in the memorizing unit 23 with the voice characteristic data D outputted from the voice characteristic extraction unit 22, and outputs a comparison result informing signal.

The voice capturing microphone 21 is installed, for example, in the central part of the ceiling in the car to capture effectively the voice of fellow passengers on the front passenger seat 52 and the back seat 53.

The driver, in advance, pushes a push button switch equipped with the register unit 24, sets the register unit 24 in motion, has the voice capturing microphone 21 capture his/her own voice, has the voice characteristic extraction unit 22 output the voice characteristic data D based on the voice, and has the register unit 24 register the voice characteristic data D in the memorizing unit 23. Namely, the memorizing unit 23 memorizes the voice characteristic data D indicating the characteristic wave form and so forth of the driver's voice.

Then, this voice recognition device 20 captures the voice propagated in the car by the voice capturing microphone 21, uses the voice characteristic data D memorized in the memorizing unit 23, and recognizes whether the voice is the driver's voice or not.

In other words, in the voice recognition unit 20, when the voice capturing microphone 21 captures the propagated voice in the car and outputs the voice signals, the voice characteristic extraction unit 22, based on the voice signals, outputs the voice characteristic data D indicating the characteristics of the voice to the comparison unit 25. Then, when the comparison unit 25 receives the voice characteristic data D from the voice characteristic extraction unit 22, reads the voice characteristic data D memorized in the memorizing unit 23, and compares the two voice characteristic data D. As a result, when the comparison unit 25 judges that the two voice characteristic data D are closely analogous to each other or the same data, it outputs the comparison result informing signal indicating that the voice captured by the voice capturing microphone 21 is the driver's voice. When the comparison unit 25 judges that the two voice characteristic data D are not closely analogous to each other and the different data, the comparison unit 25 outputs the comparison result informing signal indicating that the voice captured by the voice capturing microphone 21 is not the driver's voice.

While the voice recognition device is used as the detection unit 13, when the control unit 17 receives the comparison result informing signal indicating that the voice captured by the voice capturing microphone 21 is the driver's voice, it judges that there is no fellow passenger in the car and when the control unit 17 receives the comparison result informing signal indicating that the voice captured by the voice capturing microphone 21 is not the driver's voice, it judges that there is a fellow passenger.

Figure 8:
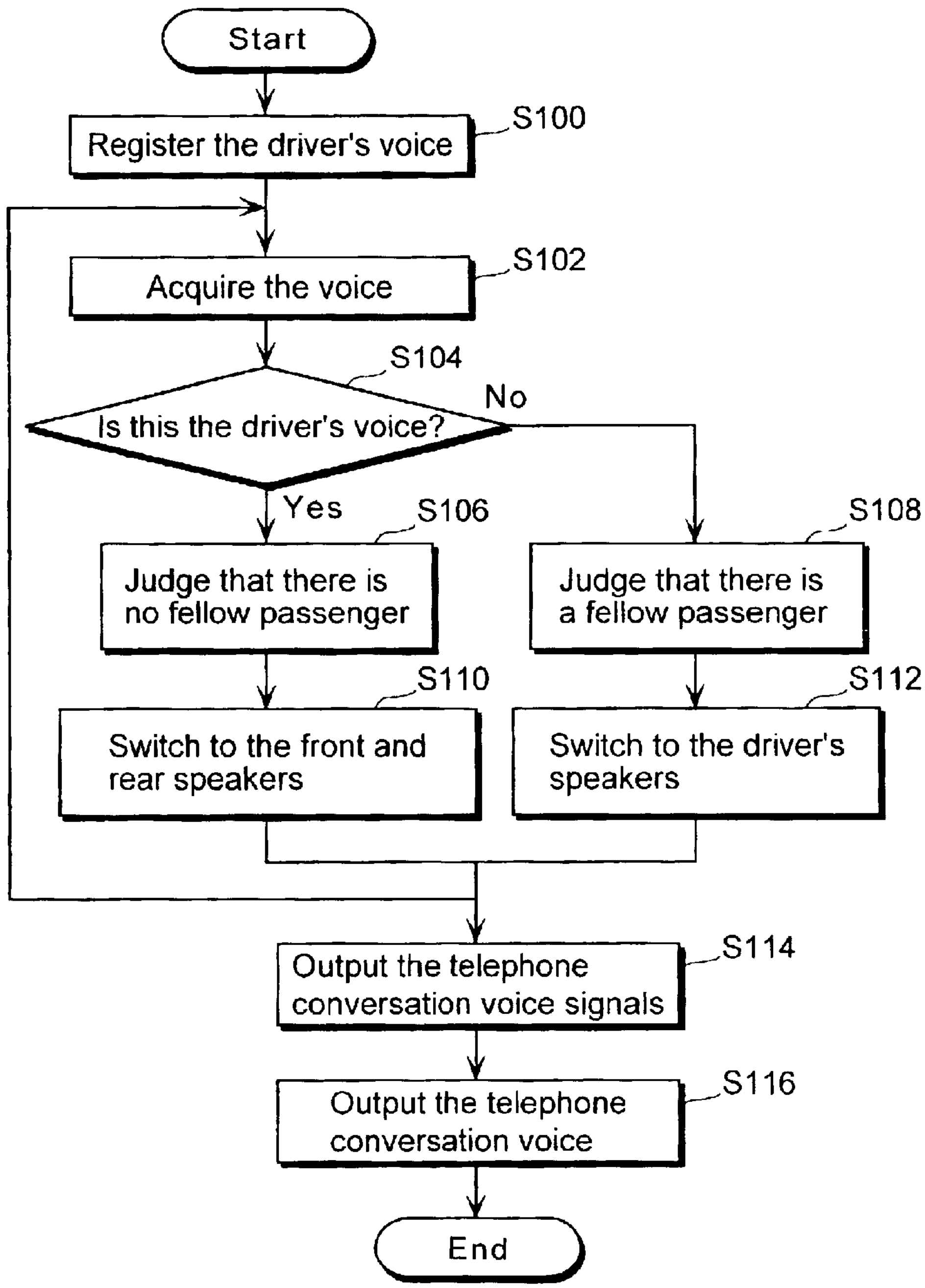
FIG. 8 is a flow chart that shows operations of the voice recognition device when the voice recognition device is used.

FIG. 8 is a flow chart that shows operations of a hands-free system when the voice recognition device 20 is used as the recognition unit 13.

For a start, the driver registers his/her voice in the voice recognition device 20 in advance. In other words, as was stated above, the driver has the memorizing unit 23 memorize the voice characteristic data D based on his/her voice (Step S100).

Next, the voice recognition device 20 captures the voice within the car. In other words, the voice capturing microphone 21 of the voice recognition device 20 captures the propagated voice within the car and outputs the voice signals (Step S102).

Then, when the voice characteristic extraction unit 22 of the voice recognition device 20 creates the voice characteristic data D based on the voice signals from the voice capturing microphone 21 and outputs the voice characteristic data D to the comparison unit 25, the comparison unit 25 not only receives this voice characteristic data D but also reads the voice characteristic data D memorized in the memorizing unit 23, and recognizes whether the voice captured by the voice capturing microphone 21 is the driver's voice or not by comparing the two voice characteristic data D (Step S104).

Here, when the comparison unit 25 of the voice recognition device 20 judges that the voice captured by the voice capturing microphone 21 is the driver's voice and outputs the comparison result informing signal indicating the result (Yes at Step S104), the control unit 17 judges that there is no fellow passenger in the car because of the comparison result informing signal (Step S106). By doing this, the control unit 17, similarly as was stated above, outputs the instruction signal to the switch signal output unit 16*bb*, and the selected places to which the signal of the selector switch 16*b* is outputted is switched to the amplifiers 15*a* and 15*b* for the front speakers 11*a* and 11*b* and the rear speakers 11*c* and 11*d* (Step S110).

On the other hand, when the comparison unit 25 of the voice recognition unit 20 judges that the voice captured by the voice capturing microphone 21 is not the driver's voice and outputs the comparison result informing signal indicating the result (No at Step S104), the control unit 17 judges that there is a fellow passenger in the car because of the comparison result informing signal (Step S108). By doing this, the control unit 17, similarly as was stated above, outputs the instruction signal to the switch signal output unit 16*bb*, as a result, the selected place to which the signal of the selector switch 16*b* is outputted is switched to the amplifier 15*c* for the driver's speakers 11*c* (Step S112). Here, when the control unit 17 judges that there is a fellow passenger in the car at the Step S108, it controls the switch signal output unit 16*bb* so that the selected place to which the signal of the selector switch 16*b* is outputted should be the amplifier 15*c* during the specified time. Namely, during the specified time, even if the control unit 17 receives the comparison result informing signal indicating that the voice captured by the voice capturing microphone 21 is the driver's voice from the voice recognition device 20, the control unit 17 does not switch the selected place to which the signal of the selector switch 16*b* is outputted and keeps the amplifier 15*a* as the selected place to which the signal of the selector 16*b* is outputted. As a result, even if the driver and the fellow passenger have a conversation, for example, it is possible to prevent the selected place to which the signal of the selector switch 16*b* is outputted from switching every time the driver and the fellow passenger have a conversation.

As was stated above, after the selector switch 16*b* is set to be switched at Step S110 or Step S112, the driver operates the operation unit 18 and makes the status of the cellular phone 90 off hook. Then, when the control unit 17 of the control equipment 10 receives the telephone conversation voice signals from the cellular phone 90 through the communication unit 14, the control unit 17 outputs the telephone conversation voice signals to the selector switch 16*b* (Step S114).

By doing this, when a hands-free telephone conversation starts and the selected places to which the signal of the selector switch 16*b* is outputted are set as the amplifiers 15*a* and 15*b*, the telephone conversation voice of the other party of the telephone conversation is outputted from the front speakers 11*a* and 11*b* and the rear speakers 11*c* and 11*d*, and when the selected place to which the signal of the selector switch 16*b* is outputted is set as the amplifier 15*c*, the telephone conversation voice of the other party of the telephone conversation is outputted from the two driver's speakers 11*e* (Step S116).

Incidentally, in the above-mentioned case, only the driver's voice characteristic data D are memorized by the memorizing unit 23 of the voice recognition 20, and it is acceptable that the voice characteristic data D of the person other than the driver are memorized by the memorizing unit 23.

In this case, the voice characteristic data D include recognition information to recognize whether the voice characteristic data D indicate the driver's voice characteristic or the voice characteristic of the person other than the driver. Additionally, it is acceptable that the plural voice recognition data D are memorized by the memorizing unit 23.

By doing this, when the comparison unit 25 reads the driver's voice characteristic data D from the memorizing unit 23, compares the driver's voice characteristic data D with the voice characteristic data D outputted from the voice characteristic extraction unit 22, even if the two voice characteristic data D are analogous to each other and therefore it is difficult to recognize whether the voice captured by the voice capturing microphone 21 is the driver's voice or not, the comparison unit 25 reads the voice characteristic data D of the person other than the driver from the memorizing unit 23, compares the voice characteristic D with the voice characteristic data D outputted by the voice characteristic extraction unit 22, and can easily recognize whether the voice captured by the voice capturing microphone 21 is the driver's voice or not. Therefore, the accuracy of the recognition by the comparison unit 25 increases and the processing time to recognize the driver's voice is shortened.

Furthermore, as was stated above, when the plural voice characteristic data D are memorized by the memorizing unit 23, it is acceptable that each voice characteristic data D includes the specific address of the devices (for example, MAC address (Media Access Control address)) assigned to the cellular phone 90 of the person corresponding to the voice characteristic data D.

In this case, the control unit 17 of the control equipment 10 acquires, through the communication unit 14, the above-mentioned address of the cellular phone 90 whose communication link with the communication unit 14 is established, and transmits the address to the comparison unit 25 of the voice recognition device 20. Then, the comparison unit 25 compares the address received from the control unit 17 with the address included in each voice characteristic data D registered in the memorizing unit 23, and recognize the voice characteristic data D that includes the identical address as the driver's voice characteristic data D.

By doing this, for example, when the driver switches to another person, the cellular phone 90 whose communication link with the communication unit 14 is established also switches to the cellular phone 90 that the person owns, and when the person's voice characteristic data D are registered in the memorizing unit 23, it is possible that the user has the voice recognition device 20 output the appropriate comparison result informing signal according to whether there is a fellow passenger in the car or not, without changing the recognition information of the voice characteristic data D registered in the memorizing unit 23.

Next, another variant of the detection unit 13 is explained.

Figure 9:
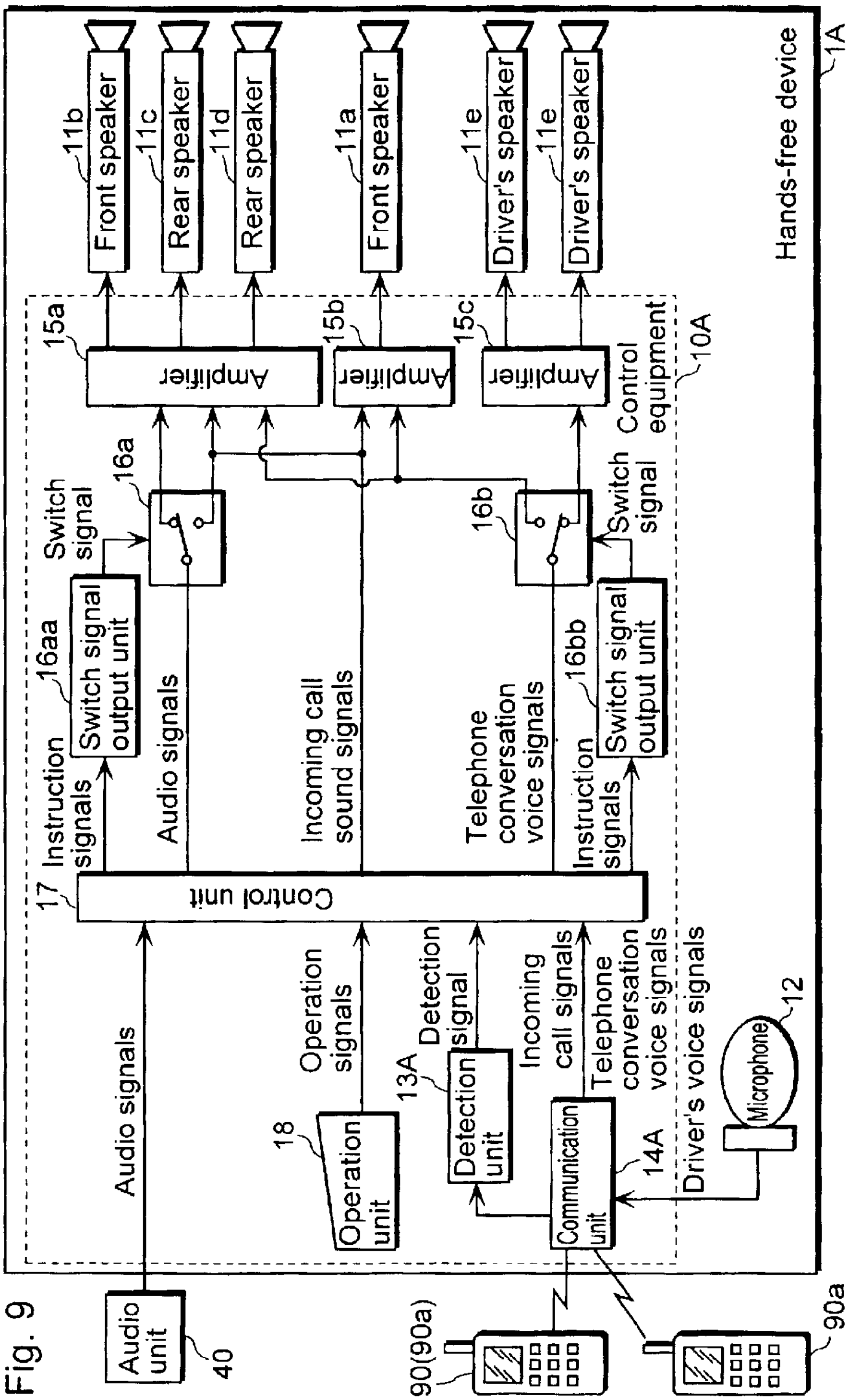
FIG. 9 is a diagram that shows a structure of another variant of the hands-free device.

FIG. 9 is a diagram that shows a structure of a hands-free system according to a variant of the detection unit 13.

The hands-free system according to this variant comprises a hands-free device 1A and a cellular phone 90. The hands-free device 1A includes: front speakers 11*a* and 11*b*; rear speakers 11*c* and 11*d*; driver's speakers 11*e*; a microphone 12; and control equipment 10A.

The control equipment 10A comprises: amplifiers 15*a*, 15*b*, and 15*c*; selection switches 16*a* and 16*b*; switch signal output unit 16*aa* and 16*bb*; a control unit 17; an operation unit 18; a communication unit 14A; and a detection unit 13A.

The communication unit 14A not only does similar operations to the above-mentioned communication unit 14, but also outputs a signal indicating the communication status among other communication devices to the outside.

The detection unit 13A, based on the signal outputted from the communication unit 14A, recognizes whether there is only one cellular phone that can communicate with the communication unit 14A or there are plural cellular phones in the car, and outputs a detection signal in response to the recognized result.

The control unit 17 of the control equipment 10A, as stated above, searches a cellular phone 90*a* in the car that can communicate with the communication unit 14A conforming to the communication standards of Bluetooth ®.

The control unit 17 has the communication 14A broadcast an inquiry command that inquires whether the cellular phone 90*a* can communicate with the communication unit 14A. Then, the control unit 17 waits for the communication unit 14A to receive a response message, and finds out if the cellular phone 90*a* that can communicate with the communication unit 14 by the response message received.

The detection unit 13A recognizes how many response messages the communication unit 14A has received to the inquiry command broadcast once. When there is only one response message, the detection unit 13A judges that there is only one cellular phone 90*a*, and when there are plural response messages, the detection unit 13A judges that there are plural cellular phones 90*a*, and the detection unit 13A outputs the judgment result to the control unit 17 as a detection signal. Incidentally, even though devices that can communicate conforming to the communication standards of Bluetooth ), for example, a PDA (Personal Digital Assistant), a laptop, a digital camera, and so forth, are brought in the car and come into the communication area of the communication unit 14A, these devices transmit a message that includes specific information different from the above-mentioned response message. Therefore, the detection unit 13A does not judge the number of the cellular phones 90*a* including these devices based on the above-mentioned specific message.

When the control unit 17, based on the above-mentioned detection signal, recognizes that there is only one cellular phone 90*a* that can communicate with the communication unit 14A, the control unit 17 judges that there is no fellow passenger. On the other hand, when the control unit 17, based on the detection signal, recognizes that there are plural cellular phones 90*a* that can communicate with the communication unit 14A, the control unit 17 judges that there is a fellow passenger.

Figure 10:
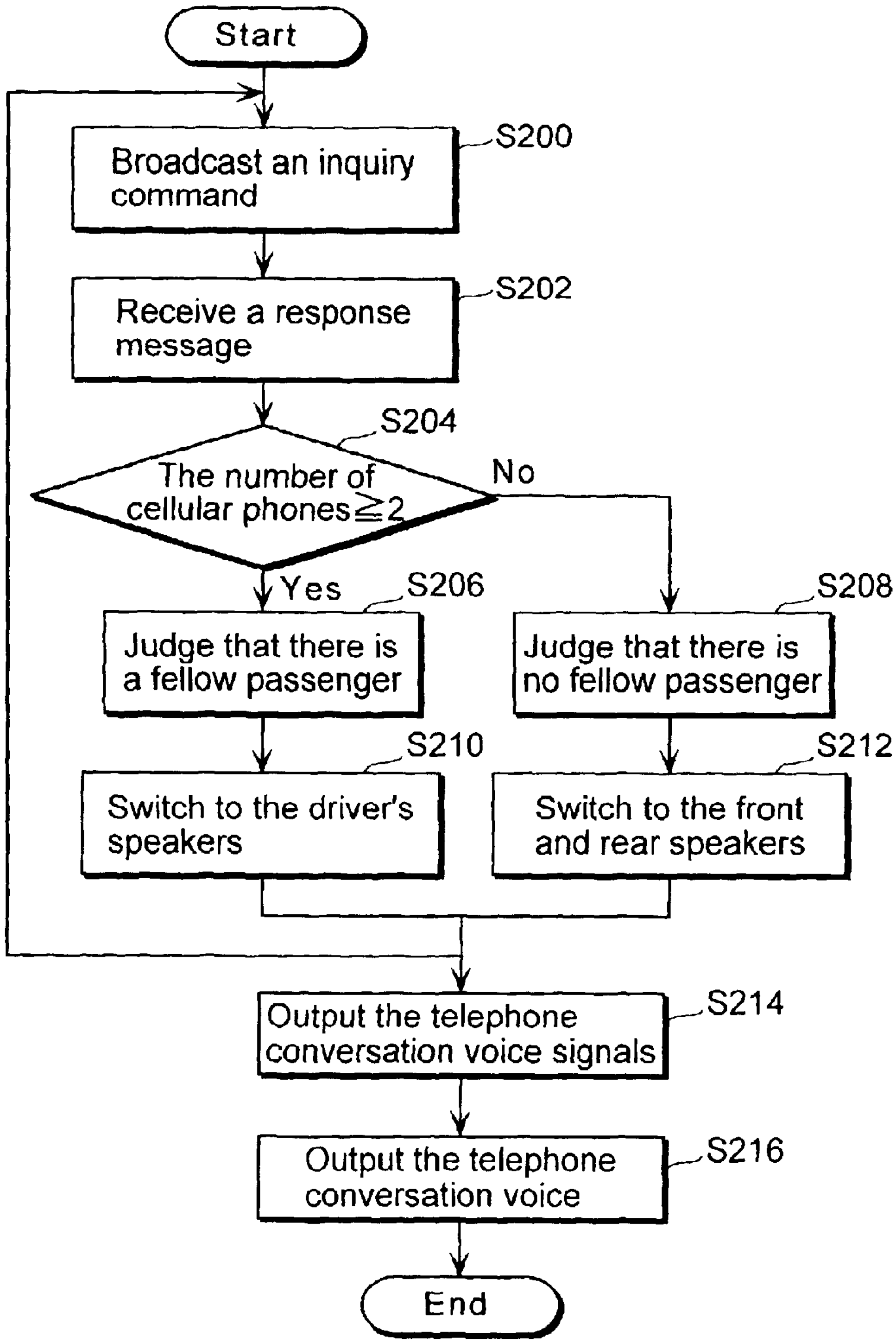
FIG. 10 is a flow diagram that shows operations of the other variant of the hands-free device.

FIG. 10 is a flow diagram that shows operations of a hands-free device including the above-mentioned detection unit 13A that judges the number of the cellular phones 90*a*.

For a start, the communication unit 14A of the control equipment 10A, as was stated above, broadcasts an inquiry command (Step S200), and receives one or plural response messages (Step S202).

When the communication unit 14A informs the detection unit 13A of this received result, the detection unit 13A, based on the received result, as was stated above, judges whether there are plural cellular phones 90*a* or not, and outputs the judgment result to the control unit 17 as a detection signal (Step S204).

Here, when the detection unit 13A judges that there are plural cellular phones 90*a* and outputs a signal indicating the result (Yes at Step S204), the control unit 17 judges that there is a fellow passenger in the car based on the detection signal (Step S206). By doing this, the control unit 17, similarly as was stated above, outputs the instruction signal to the switch signal output unit 16*bb*, and as a result, the selected place to which the signal of the selector switch is outputted is switched to the amplifier 15*c* or the driver's speakers 11*e* (Step S210).

On the other hand, when the detection unit 13A judges that there is only one cellular phone 90*a*, and outputs the detection signal indicating the result (No at Step S204), the control unit 17 judges that there is no fellow passenger in the car (Step S208). By doing this, the control unit 17, similarly as was stated above, outputs the instruction signal to the switch signal output unit 16*bb*, and as a result, the selected places to which the signal of the selector switch 16*b* is outputted are switched to the amplifiers 15*a* and 15*b* for the front speakers 11*a* and 11*b* and the rear speakers 11*c* and 11*d* (Step S212).

As was stated above, after the selector switch 16*b* is set to be switched at Step S210 or Step S212, the driver operates the operation unit 18 and makes the status of the cellular phone 90, whose communication link with the communication unit 14A is established, off hook. Then, when the control unit 17 of the control equipment 10A receives the telephone conversation voice signals from the cellular phone 90 through the communication unit 14, the control unit 17 outputs the telephone conversation voice signals to the selector switch 16*b* (Step S214).

By doing this, when a hands-free telephone conversation starts, and the selected places to which the signal of the selector switch 16*b* is outputted are set to the amplifiers 15*a* and 15*b*, the telephone conversation voice of the other party of the telephone conversation is outputted from the front speaker 11*a* and 11*b* and the rear speaker 11*c* and 11*d*, and when the selected place to which the signal of the selector switch 16*b* is outputted is set to the amplifier 15*c*, the telephone conversation voice of the other party of the telephone conversation is outputted from the two driver's speakers 11*e* (Step S216).

Incidentally, according to the present embodiment and the variant, the audio signals outputted from the control unit 17 are inputted to the amplifiers 15*a* and 15*b* through the selector switch 16*a*. On the contrary, it is acceptable to input the audio signals to the selector switch 16*a* through the amplifier 15*a*. Furthermore, according to the present embodiment and the variant, the incoming call signals outputted by the control unit 17 are inputted to the front speakers 11*a* and 11*b* and the rear speakers 11*c* and 11*d* through the amplifiers 15*a* and 15*b*. But it is acceptable to input the incoming call signals only through the amplifier 15*b* to the front speakers 11*a* and 11*b* and the rear speakers 11*c* and 11*d*. Furthermore, according to the present embodiments and the variant, the telephone conversation voice signals outputted by the control unit 17 are inputted to the amplifiers 15*a*, 15*b*, and 15*c*, through the selector switch 16*b*. But it is acceptable to input the telephone conversation voice signals to the selector switch 16*b* through the amplifier 15*c*.

In the above-mentioned case, the selector switch 16*a* switches the selected places, to which the audio signals outputted by the control unit 17 and amplified by the amplifier 15*a* are outputted, from the three speakers, the front speaker 11*b* and the rear speakers 11*c* and 11*d* to the four speakers, the front speakers 11*a* and 11*b* and the rear speakers 11*c* and 11*d*, and vice versa. Then, the selector switch 16*b* switches the selected places, to which the telephone conversation voice signals, outputted by the control unit 17 and amplified by the amplifier 15*c* are outputted, from the two driver's speakers 11*e* to the four speakers, the front speakers 11*a* and 11*b* and the rear speakers 11*c* and 11*d* and vice versa. Additionally, in the above-mentioned case, it is acceptable to dispose the amplifiers 15*a*, 15*b*, and 15*c* in one common amplifier.

(The second embodiment)

Hereinafter, a hands-free system according to the second embodiment of the present invention will be explained with reference to the figures.

Figure 11:
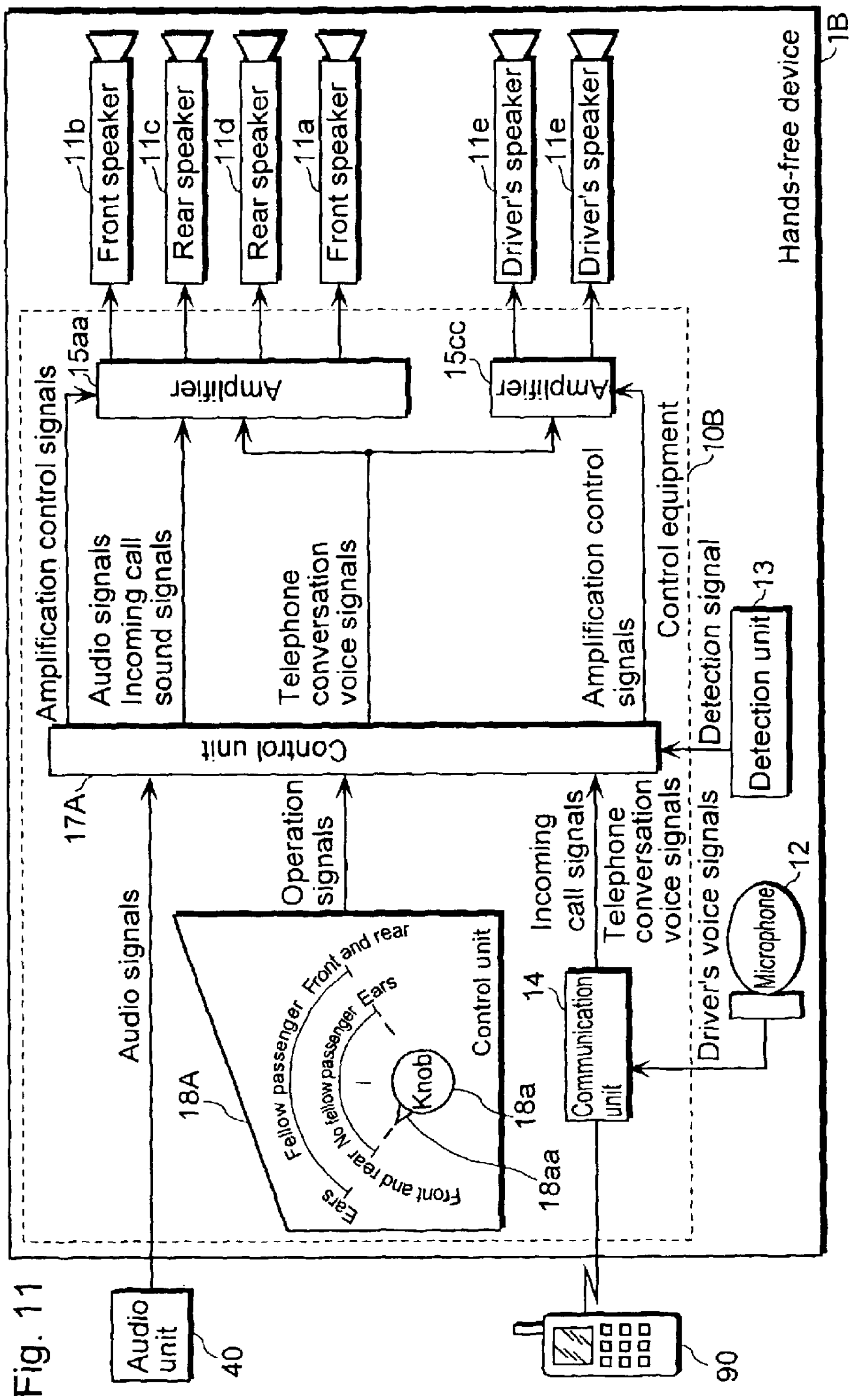
FIG. 11 is a diagram that shows a structure of a hands-free device according to the second embodiment of the present invention.

FIG. 11 is a diagram that shows a structure of a hands-free system according to the second embodiment of the present invention.

This hands-free system comprises a hands-free device 1B and a cellular phone 90. The hands-free device 1B includes: a control equipment 10B; front speakers 11*a* and 11*b*; rear speakers 11*c* and 11*d*; driver's speakers 11*e*; a detection unit 13; and a microphone 12. Furthermore, the control equipment 10B includes: the communication unit 14; amplifiers 15*aa* and 15*cc*; the control unit 17A; and an operation unit 18A. Incidentally, the same elements as the first embodiment are given the same signs and their explanations are omitted (similarly in the drawings below).

The features of the hands-free system according to the embodiment of the present invention are to detect whether there is a fellow passenger in the car or not, to change from small to large the volume of the telephone conversation voice of the other party of the telephone conversation outputted from the front speakers 11*a* and 11*b*, the rear speakers 11*c* and 11*d*, and the two driver's speakers 11*e* based on the detection result.

The amplifier 15*aa* of the operation equipment 10B amplifies input signals and outputs the input signals to the front speakers 11*a* and 11*b* and the rear speakers 11*c* and 11*d*. The amplifier 15*cc* amplifies input signals and outputs the input signals to the driver's speakers 11*e*. Additionally, when these amplifiers 15*aa* and 15*cc* input amplification control signals that will be explained later, these amplifiers 15*aa* and 15*cc* change the amplification rate of the output signals to the input signals.

The operation unit 18A of the control equipment 10B not only has the same functions as the operation unit 18 of the first embodiment but also has the function that makes it possible to set each amplification rate of the amplifiers 15*aa* and 15*cc* while the control unit 17A outputs the telephone conversation voice signals, and includes a rotary switch and a knob 18*a* that rotates freely to operate the switch. Additionally, the knob 18*a* is installed on the surface of the operation unit 18A.

When a driver rotates the knob 18*a* clockwise, the operation unit 18A instructs to reduce the amplification rate of the amplifier 15*aa* and at the same time to increase the amplification rate of the amplifier 15*cc* when there is no fellow passenger, and the operation unit 18A outputs an operation signal that instructs to increase the amplification rate of the amplifier 15*aa* and at the same time to reduce the amplification rate of the amplifier 15*cc* when there is a fellow passenger. Additionally, when the driver rotates the knob 18*a* counterclockwise, contrary to the above-mentioned, the operation unit 18A instructs to increase the amplification rate of the amplifier 15*aa* and at the same time to reduce the amplification rate of the amplifier 15*cc* when there is no fellow passenger, and the operation unit 18A outputs the operation signal that instructs to reduce the amplification rate of the amplifier 15*aa* and at the same time to increase the amplification rate of the amplifier 15*cc*. Additionally, the present embodiment is used with the knob 18*a* rotated counterclockwise so that a needle 18*aa* that sticks out from the knob 18*a* turns to the left. In other words, the operation unit 18A is set to output an operation signal to instruct that the amplification rate of the amplifier 15*aa* should be larger than the amplification rate of the amplifier 15*cc* when there is no fellow passenger and that the amplification rate of the amplifier 15*aa* should be smaller than the amplification rate of the amplifier 15*cc* when there is a fellow passenger.

Here, operations of the control unit 17A of the control equipment 10B are explained in detail.

The control unit 17A outputs the incoming call sound signals, the telephone conversation voice signals, and the audio signals to the amplifiers 15*aa* and 15*cc*, and at the same time outputs the above-mentioned amplification control signals that instructs the amplification rates of the amplifiers 15*aa* and 15*cc*.

For example, when the cellular phone 90 does not have communication with another telephone through the telephone line network 613, and the status of the audio unit 40 is on, the control unit 17A receives audio signals from the audio unit 40, and outputs the audio signals to the amplifier 15*aa*. At this time, the control unit 17A outputs the amplification control signals to the amplifier 15*aa* so that the amplification rate keeps the specified value regardless of the setting of the knob 18*a* of the operation unit 18A. In other words, when there is no incoming call to the cellular phone 90 and a hands-free telephone conversation is not made, while the status of the audio unit 40 is on, the audio sounds based on the audio signals outputted by the audio unit 40 are outputted from the front speakers 11*a* and 11*b* and the rear speakers 11*c* and 11*d*.

Then, when there is an incoming call to the cellular phone 90 and the control unit 17A receives the incoming call signals from the communication unit 14, the control unit 17A outputs the incoming call sound signals to the amplifier 15*aa*. Here, when the control unit 17A receives the incoming call signals while the control unit 17A outputs the audio signals to the amplifier 15*aa* as was stated above, the control unit 17A stops outputting the audio signals and outputs the incoming call sound signals instead of the audio signals. At this time also, the control unit 17A outputs the amplification control signals so that the amplification rate of the amplifier 15*aa* keeps the specified value regardless of the setting of the knob 18*a* of the operation unit 18A. As a result, the incoming call sounds that inform that the cellular phone 90 receives an incoming call are outputted from the front speakers 11*a* and 11*b* and the rear speakers 11*c* and 11*d*.

Furthermore, when the driver operates the operation unit 18A and makes the status of the cellular phone off hook, and therefore the cellular phone comes to be able to make a hands-free telephone conversation, the control unit 17A receives the telephone conversation voice signals from the communication unit 14, and outputs the telephone conversation voice signals to the amplifier 15*aa*. Here, as was stated above, while the control unit 17A outputs the audio signals or the incoming call sound signals to the amplifier 15*aa* and when the cellular phone 90 comes to be able to make a hands-free telephone conversation, the control unit 17A stops outputting the audio signals or the incoming call sound signals, and outputs the telephone conversation voice signals instead to the amplifiers 15*aa* and 15*cc*. Then, when the control unit 17A outputs the telephone conversation voice signals as was stated above, the control unit 17A outputs the amplification control signals to each of the amplifiers 15*aa* and 15*cc* according to the operation signals outputted by the setting of the above-mentioned knob 18*a* from the operation unit 18A and the detection signal from the detection unit 13.

Here, to be more specific, the operations of the hands-free system when the cellular phone 90 is able to be used in a hands-free telephone conversation will be explained.

Figure 12:
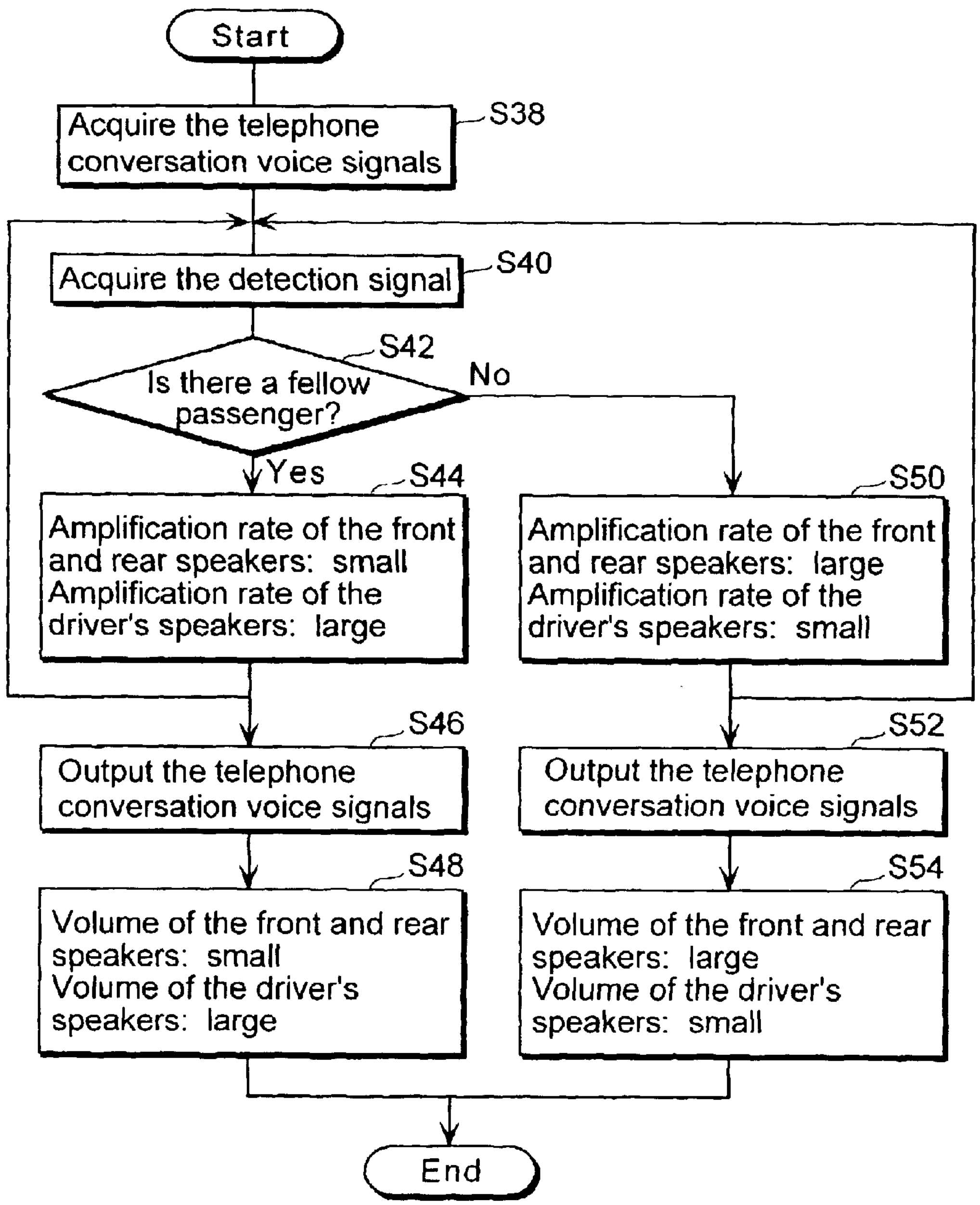
FIG. 12 is a flow diagram that shows operations of the hands-free device.

FIG. 12 is a flow diagram that shows operations of a hands-free system when the cellular phone 90 is able to be used in a hands-free telephone conversation.

When the cellular phone 90 is able to be used in a hands-free telephone conversation, the control 17A receives the telephone conversation voice signals from the communication unit 14 (Step S38).

Then, the control unit 17A, which has received the telephone conversation voice signals, acquires the detection signal from the two pressure sensors 13*a* and 13*b* of the detection unit 13 (Step S40).

The control unit 17A realizes that voltage readings acquired from each detection signal are below the specified value, and judges that a hands-free telephone conversation is being made when there is no fellow passenger (No at Step S42).

Then, based on the above-mentioned judgment result and the contents instructed by the operation signals from the operation unit 18A, the control unit 17A outputs the amplification control signals to each of the two amplifiers 15*aa* and 15*cc*. As a result, the amplification rate of the amplifier 15*aa* at the side of front speakers 11*a* and 11*b* and the rear speakers 11*c* and 11*d* becomes large, and the amplification rate of the amplifier 15*cc* at the side of the driver's speakers 11*e* becomes small (Step S50).

Later, the control unit 17A outputs the telephone conversation voice signals to both of the amplifiers 15*aa* and 15*cc* (Step S52).

As a result, the telephone conversation voice of the other party of the telephone conversation is outputted in a large sound volume from the front speakers 11*a* and 11*b* and the rear speakers 11*c* and 11*d* and in a small sound volume from the two driver's speakers 11*e* at the headrest 51*a* (Step S54).

Additionally, at the step S42, when the control unit 17A realizes that the voltage reading of at least one of the pressure sensors 13*a* and 13*b* of the detection unit 13 exceeds the specified value, the control unit 17A judges that a hands-free telephone conversation is made when there is a fellow passenger (Yes at Step S42).

Then, based on the above-mentioned judgment result and the contents instructed by the operation signals from the operation unit 18A, the control unit 17A outputs the amplification control signals to each of the two amplifiers 15*aa* and 15*cc*. As a result, the amplification rate of the amplifier 15*aa* at the side of front speakers 11*a* and 11*b* and the rear speakers 11*c* and 11*d* becomes small, and the amplification rate of the amplifier 15*cc* at the side of the driver's speakers 11*e* becomes large (Step S44)

Later, the control unit 17A outputs the telephone conversation voice signals to the both of the amplifiers 15*aa* and 15*cc* (Step S46).

As a result, the telephone conversation voice of the other party of the telephone conversation is outputted in a small sound volume from the front speakers 11*a* and 11*b* and the rear speakers 11*c* and 11*d* and in a large sound volume from the two driver's speakers 11*e* at the headrest 51*a* (Step S48).

Figure 13A:
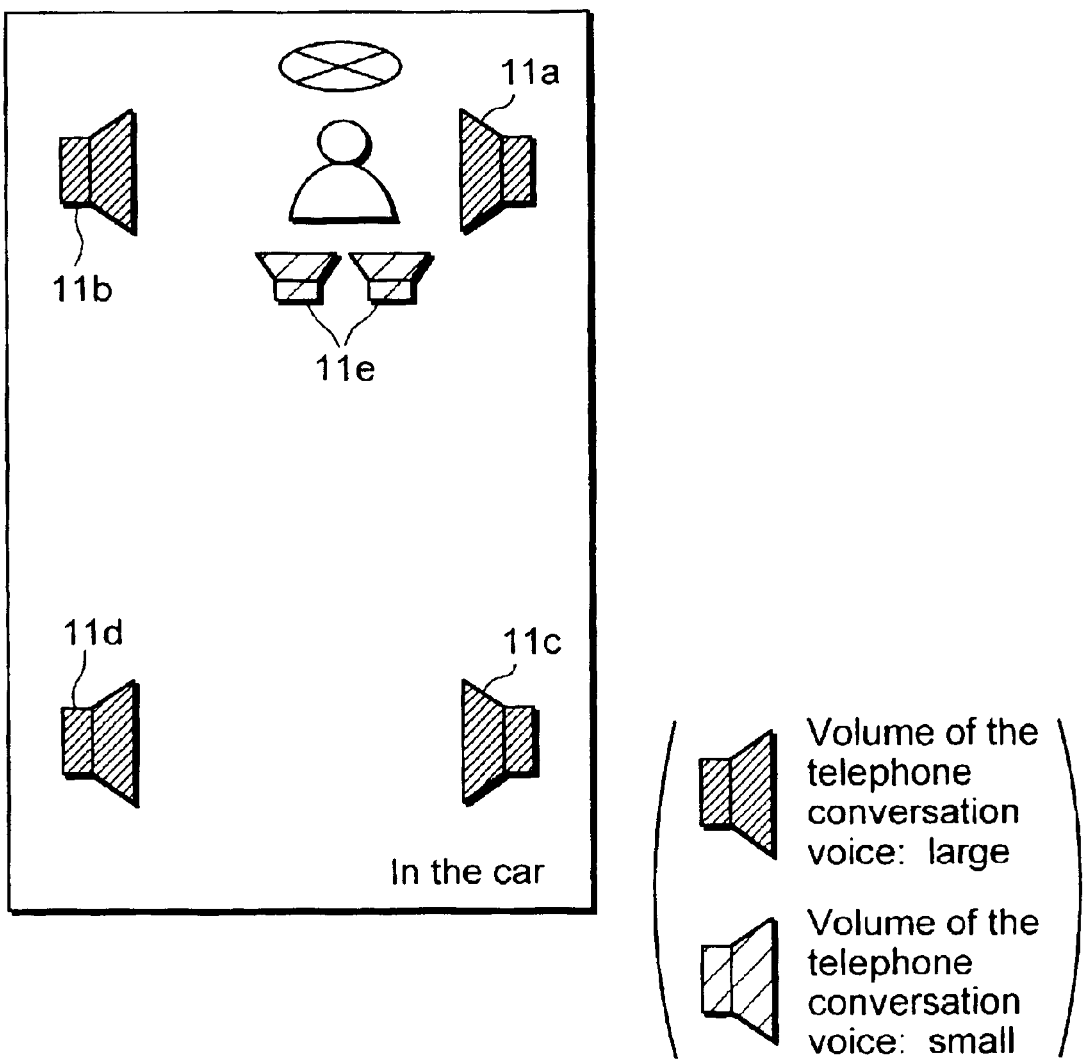
FIG. 13A is an explanatory diagram that explains the output situation of the speakers of the hands-free system when there is no fellow passenger.
Figure 13B:
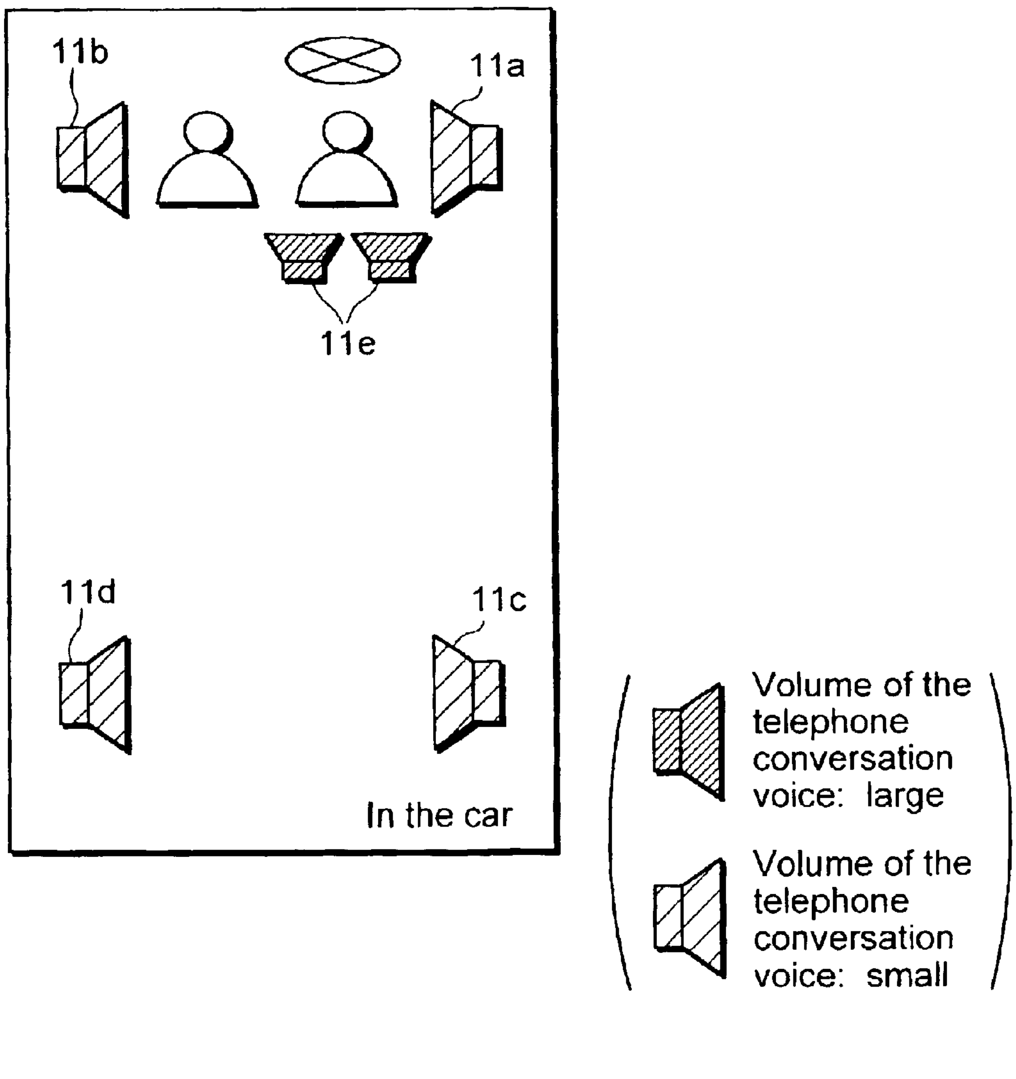
FIG. 13B is an explanatory diagram that explains the output situation of the speakers of the hands-free system when there is a fellow passenger.

FIGS. 13A and 13B are explanatory diagrams that explain the output situation of the front speakers 11*a* and 11*b*, the rear speakers 11*c* and 11*d*, and the driver's speakers 11*e*. FIG. 13A is an explanatory diagram when there is no fellow passenger, and FIG. 13B is an explanatory diagram when there is a fellow passenger.

As was explained above, when a hands-free telephone conversation is made when there is no fellow passenger, the control unit 17A receives the operation signals in response to the above-mentioned setting of the knob 18*a* from the operation unit 18A, and outputs the amplification control signals to each of the amplifiers 15*aa* and 15*cc* so that the amplification rate of 15*aa* becomes large and the amplification rate of 15*cc* becomes small. As a result, as FIG. 13A shows, the telephone conversation voice of the other party of the telephone conversation is outputted in a small sound volume from the two driver's speakers 11*e* at the headrest 51*a* and in a large sound volume from the front speakers 11*a* and 11*b* and the rear speakers 11*c* and 11*d*. On the other hand, when a hands-free telephone conversation is made when there is a fellow passenger, the control unit 17A receives the operation signals in response to the above-mentioned setting of the knob 18*a* from the operation unit 18A, and outputs the amplification control signals to each of the amplifiers 15*aa* and 15*bb* so that the amplification rate of the amplifier 15*aa* reduces and the amplification rate of the amplifier 15*cc* increases. As a result, as FIG. 13B shows, the telephone conversation voice of the other party of the telephone conversation is outputted in a large sound volume from the two driver's speakers 11*e* at the headrest 51*a* and in a small sound volume from the front speakers 11$a$ and 11$b$ and the rear speakers 11$c$ and 11$d$.

As just described, according to the present embodiment, because the control unit 17A changes the amplification rate of the amplifiers 15$aa$ and 15$cc$ in response to the detection signal of the detection unit 13, when the driver makes a hands-free telephone conversation while there is no fellow passenger, the telephone conversation voice of the other party of the telephone conversation is outputted mainly from the front speakers 11$a$ and 11$b$ and the rear speakers 11$c$ and 11$d$, and propagates in the car, the driver can hear the telephone conversation voice with a good sound quality. When there is a fellow passenger, the telephone conversation voice of the other party of the telephone conversation is outputted mainly by the two driver's speakers 11$e$, which are near the driver's ears, and therefore it is possible to prevent the fellow passenger from hearing the telephone conversation voice, and the privacy is protected.

(The third embodiment)

Hereinafter, a hands-free system according to the third embodiment of the present invention will be explained with reference to the figures.

Figure 14:
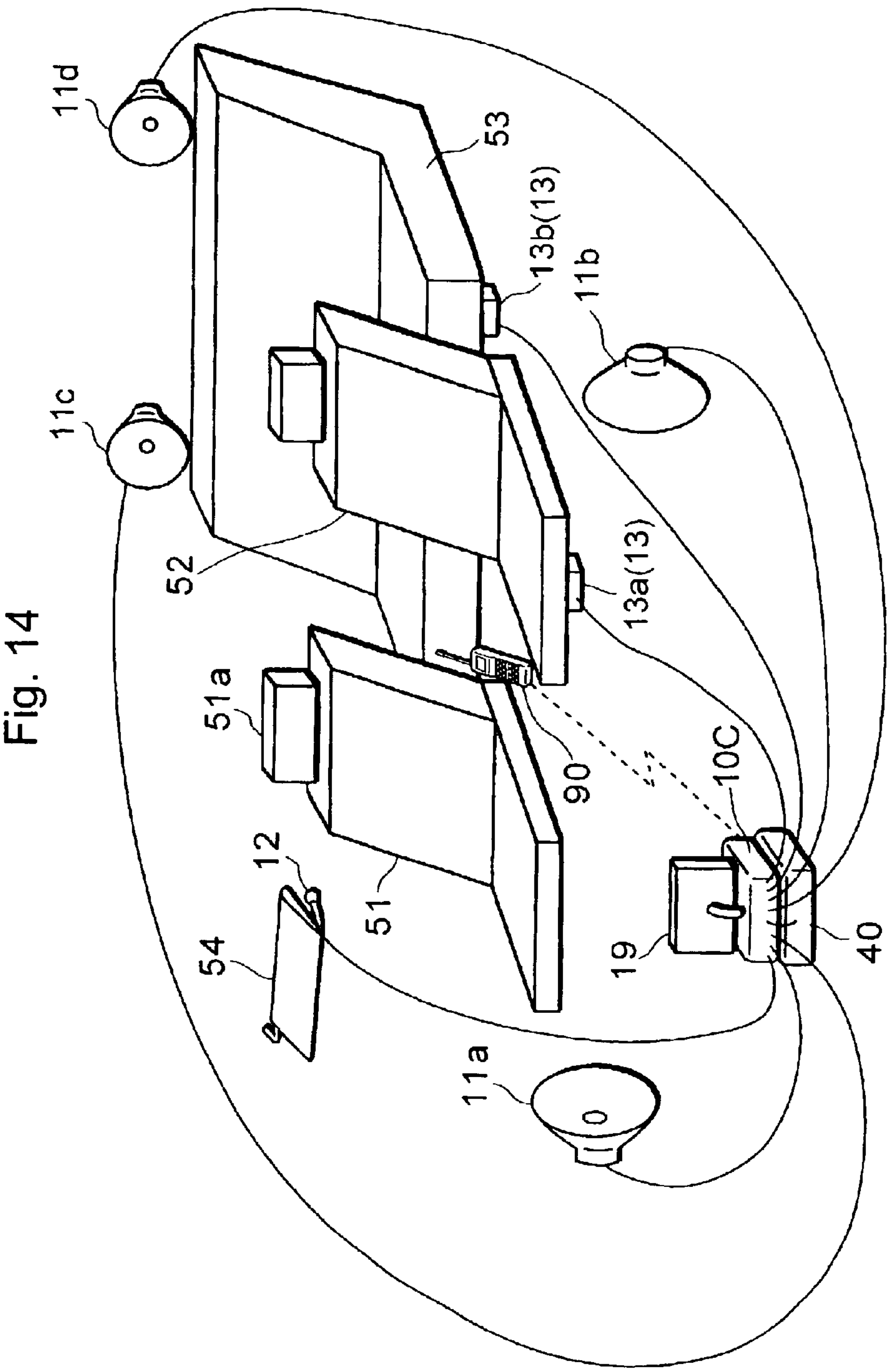
FIG. 14 is a diagram that shows an outline structure of a hands-free system according to the third embodiment of the present invention.

FIG. 14 is a diagram that shows an outline structure of a hands-free system according to the third embodiment of the present invention.

The features of this hands-free system are to detect whether there is a fellow passenger in the car or not and to display in letters the contents of the telephone conversation voice of the other party of the telephone conversation when there is a fellow passenger. This hands-free system comprises: front speakers 11$a$ and 11$b$; rear speakers 11$c$ and 11$d$; driver's speakers 11$e$; a detection unit 13; a microphone 12; a cellular phone 90; and control equipment 10C. Additionally, this hands-free system does not have the driver's speakers 11$e$ in contrast to the first and second embodiments. Incidentally, the same elements as the first and second embodiments are given the same signs and their explanations are omitted (similarly in the drawings below).

Figure 15:
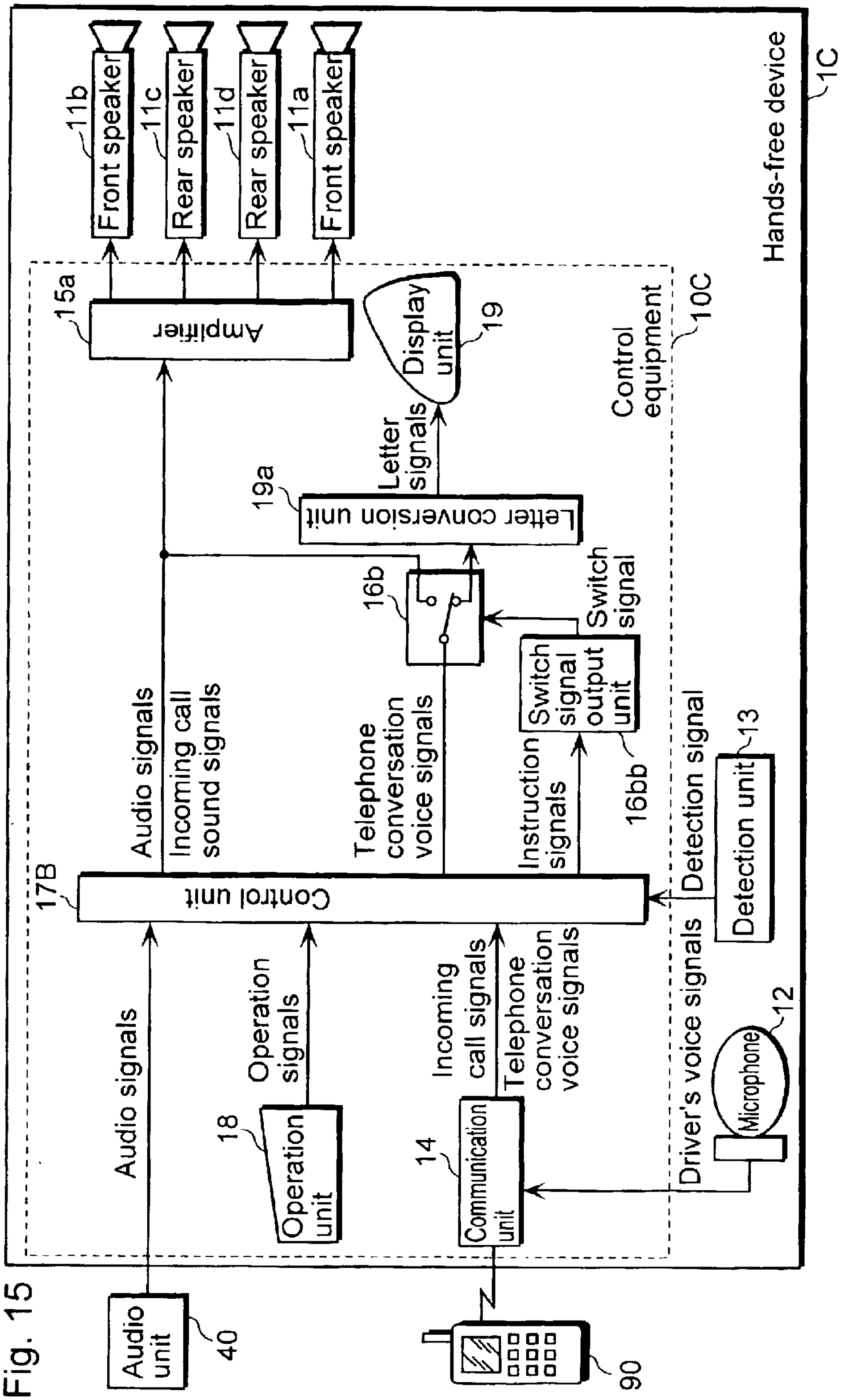
FIG. 15 is a diagram that shows a structure of the hands-free system.

FIG. 15 is a diagram that shows a structure of a hands-free device 1C according to the present embodiment.

According to the present embodiment, the hands-free device 1C comprises: front speakers 11$a$ and 11$b$; rear speakers 11$c$ and 11$d$; a microphone 12; a detection unit 13; and control equipment 10C.

The control equipment 10C, like the first and second embodiments, includes: a communication unit 14; an amplifier 15$a$; a selector switch 16$b$; a switch signal output unit 16$bb$; an operation unit 18; and a control unit 17B. The control equipment 10C further includes: a display unit 19 that displays letters and picture images in response to input signals; a letter conversion unit 19$a$ that, based on telephone conversation voice signals outputted from the control unit 17B, creates letter signals that display contents of the telephone conversation voice in letters in the display unit 19, and outputs the letter signals as the above-mentioned input signals to the display unit 19. Here, according to the present embodiment, the display unit 19 and the letter conversion unit 19$a$ compose display means.

The display unit 19 is equipped with, for example, a liquid crystal display 19$d$ (refer to FIG. 16), and on this liquid crystal display 19$d$, the letters in response to the above-mentioned letter signals are displayed. Additionally, the control equipment 10C is installed in the car with the liquid crystal display tilted to the driver's seat so that only the driver can see the contents displayed on the liquid crystal display 19$d$ of the display unit 19.

The amplifier 15$a$, like the first embodiment, amplifies the input signals, and outputs the signals to the front speakers 11$a$ and 11$b$ and the rear speakers 11$c$ and 11$d$. Then, the selector switch 16$b$ switches the selected place to which the input signals are outputted from the above-mentioned amplifier 15$a$ to the letter conversion unit 19$a$ and vice versa in response to the switch signal from the switch signal output unit 16$bb$.

Additionally, according to the present embodiment, while the control unit 17B receives the audio signals from the audio unit 40, the control unit 17B outputs the audio signals to the amplifier 15$a$, and while the control unit 17B receives the incoming call signals from the communication unit 14, the control unit 17B outputs the incoming call sound signals to the amplifier 15$a$. Here, while the control 17B receives the audio signals and the incoming call signals, the control 17B gives a priority to the incoming call sound signals and outputs the incoming call sound signals to the amplifier 15$a$. Furthermore, when the control unit 17B receives the telephone conversation voice signals from the communication unit 14, the control unit 17B outputs the telephone conversation voice signals to the selector switch 16$b$.

Moreover, when voltage readings of the detection signals from the two pressure sensors 13$a$ and 13$b$ are below the specified value, the control unit 17B realizes that there is no fellow passenger on the front passenger seat and the back seat, and outputs to the switch signal output unit 16$bb$ an instruction signal to instruct that the selected place to which the signal of the selector switch is outputted should be the amplifier 15$a$.

On the other hand, when the voltage reading of at least one of the detection signals from the two pressure sensors 13$a$ and 13$b$ of the detection unit 13 exceeds the specified value, the control unit 17 judges that there is a fellow passenger in the car, and outputs to the switch signal output unit 16$bb$ an instruction signal to instruct that the selected place to which the signal of the selector switch is outputted should be the letter conversion unit 19$a$.

As a result, when the status of the audio unit 40 is on, the audio sounds are outputted from the front speakers 11$a$ and 11$b$ and the rear speakers 11$c$ and 11$d$ and at this status when the cellular phone 90 receives an incoming call, the output of the audio sounds is stopped, and the incoming call sounds are outputted from the front speakers 11$a$ and 11$b$ and the rear speakers 11$c$ and 11$d$. Then when the driver operates the operation unit 18 and starts a hands-free telephone conversation, the telephone conversation voice of the other party of the telephone conversation becomes letters, which are displayed on the liquid crystal display 19$d$ of the display unit 19. At this time, when the status of the audio unit 40 is on, the audio sounds are outputted from the front speakers 11$a$ and 11$b$ and the rear speakers 11$c$ and 11$d$, and therefore the driver can grasp the telephone conversation voice of the other party of the telephone conversation by reading the letters on the liquid crystal display 19$d$ while listening to the audio sounds.

Figure 16:
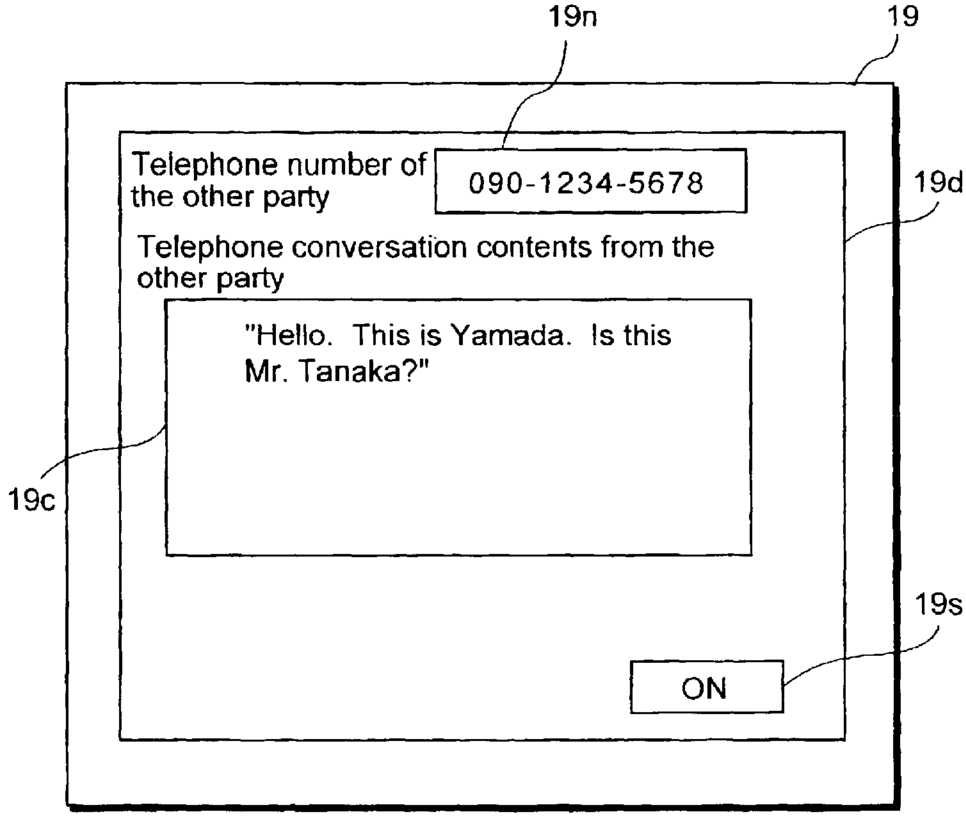
FIG. 16 is a screen display diagram that shows an example of a screen displayed on a display unit of the hands-free system.

FIG. 16 is a screen display diagram that shows an example of a screen displayed on a display unit 19 while a hands-free telephone conversation is made.

As FIG. 16 shows, while a free-hands telephone conversation is made, a telephone number display field 19$n$, a telephone conversation contents display field 19$c$, and a status display field 19$s$ are displayed on the liquid crystal display 19$d$ of the display unit.

In the telephone number display field 19$n$, the telephone number of the other party of the telephone conversation, for example, "090-1234-5678" is displayed. In the telephone conversation contents display field 19$c$, the telephone conversation contents from the other party of the telephone conversation, for example, "Hello. This is Yamada. Is this Mr. Tanaka?", are displayed. In the status display field 19*s*, the letters "ON" are displayed to show that the telephone conversation is going on.

By looking at this liquid crystal display 19*d* of the display unit 19, the driver realizes whether the telephone conversation is going on or not from the status display filed 19*s*, and at the same time, finds out the telephone number of the other party of the telephone conversation from the telephone number display field 19*n*, and furthermore, can grasp the telephone conversation contents by reading the letters displayed on the telephone conversation contents display field 19*c*.

In other words, according to the present embodiment, in the case of a hands-free telephone conversation being made, when there is no fellow passenger in the car, the telephone conversation voice from the other party of the telephone conversation is outputted from the front speakers 11*a* and 11*b* and the rear speakers 11*c* and 11*d*, and therefore the driver can hear the telephone conversation voice in good sound quality. When there is a fellow passenger, the telephone conversation contents from the other party of the telephone conversation are displayed on the display unit 19, and therefore it is possible to prevent the fellow passenger from knowing the telephone conversation contents of the other party of the telephone conversation. Additionally, because the liquid crystal display 19*d* of the display unit 19 is tilted to the driver's seat 51, it is possible to prevent the fellow passenger from reading the letters displayed on the liquid crystal display 19*d*.

Additionally, when the control unit 17B detects that the communication unit 14 receives the driver's voice signals from the microphone 12, the control unit 17B has the communication unit 14 transmit the driver's voice signals to the cellular phone 90, and at the same time has the display unit 19 erase the past letters that show the contents of the telephone conversation voice from the other party of the telephone conversation displayed on the liquid crystal display 19*d* of the display unit 19.

For example, with the telephone conversation contents display field 19*c* display the letters that shows the telephone conversation contents like "Hello. This is Yamada. Is this Mr. Tanaka?", when the driver responds to the telephone conversation contents and utters a voice, "Yes, this is he speaking." to the microphone 12, the microphone 12 transmits the driver's voice signals indicating the voice, "Yes, this is he speaking." to the communication unit 14. Then, when the control unit 17B detects that the communication unit 14 has received the driver's voice signals, the control unit 17B has the communication 14 transmit the driver's voice signals to the cellular phone 90, and at the same time, has the display unit 19 erase the past letters displayed on the telephone conversation contents display field 19*c*, "Hello. This is Yamada. Is this Mr. Tanaka?"

As a result, when the control unit 17B receives the telephone conversation voice signals afresh from the communication unit 14, as was stated above, the control unit 17B, the letter conversion unit 19*a*, and the display unit 19 operate, and therefore, on the telephone conversation contents display field 19*c* of the display unit 19, the telephone conversation contents indicated by the latest telephone conversation voice signals, for example, "Mr. Tanaka. How are you?"only are displayed in letters.

By doing this, the driver, without being bewildered by the past letters displayed on the telephone conversation contents display field 19*c*, can see easily the latest letters.

Incidentally, according to the present embodiment, the control equipment 10C includes the display unit 19, which displays the telephone conversation contents by letters. But when a display device that can display any letter is installed in the car, it is acceptable for the display device to display the telephone conversation contents by letters. For example, when the car is equipped with a navigation system that displays maps and guides the driver to the destinations and so forth, it is acceptable for the display device that is equipped with the navigation system and displays the maps (for example, liquid crystal display) to display the telephone conversation contents by letters.

In this case, the control equipment 10C and the navigation system are connected by cable or wirelessly so that the letter signals outputted from the letter conversion unit 19*a* of the control equipment 10C are inputted to the above-mentioned display device.

By doing this, it is needless for the control equipment 10C to have the display unit 19, and therefore, it is possible to lessen the component parts, to make the equipment 10C smaller, and to reduce the cost.

Up to this point, the hands-free system according to the present invention is explained using the embodiments 1–3. But the present invention is not limited by them.

For example, according to the first and second embodiments, the driver's speakers 11*e* are explained as the speakers with directional characteristic. But it is acceptable that the driver's speakers 11*e* do not have the directional characteristic in the case of the outputted sound being hard for a fellow passenger to hear. In other words, when each of the driver's speakers 11*e* is buried in the headrest 51*a* so that the driver's speakers 11*e* cover the ears of the driver who sits on the driver's seat 51, it is acceptable that the driver's speakers 11*e* do not have the directional characteristic.

Here, in the case of using the driver's speakers 11*e* that do not have the directional characteristic, it is acceptable to use a speaker that outputs the sound by vibrating a diaphragm made of a piezoelectric elements, for example, like the speaker made by Matsushita Communication Industrial Co., Ltd, (the brand name "card speaker", the model number "WM-R30B" or "WM-R57A") as the driver's speaker 11*e*. In this case, it is possible to make the driver's speaker 11*e* smaller and thinner, and therefore it is easier to bury the two driver's speakers 11*e* to the headrest 51*a* and also it is possible for the headrest 51*a* and the driver's speakers 11*e* to look better.

Furthermore, according to the first and second embodiments, the two driver's speakers 11*e* are buried in the headrest 51 a. But in the case of the sound outputted by the driver's speakers 11*e* being hard for a fellow passenger other than the driver to hear, it is acceptable to install the driver's speakers 11*e* at any place in the car and to install the driver's speakers 11*e*, for example, on the ceiling of the car.

Additionally, according to the first and second embodiments, the two driver's speakers are buried in the headrest 51*a* of the driver's seat 51, but it is acceptable to bury two speakers with directional characteristic like the driver's speakers 11*e* in the headrest of the front passenger's seat and for a fellow passenger who sits on the front passenger's seat to make a hands-free telephone conversation using his/her own cellular phone.

In this case, the hands-free systems 1, 1A, and 1B further include the fellow passenger's microphone that captures the voice of the above-mentioned fellow passenger and outputs the signals indicating the voice to the communication units 14, 14A. The control equipment 10, 10A, and 10B further include an amplifier like the amplifier 15*c*. The communication units 14 and 14A communicate not only with the driver's cellular phone 90 but also with the fellow passenger's cellular phone, receives the telephone conversation voice signals indicating the telephone conversation voice of the other party of the telephone conversation of the fellow passenger from the fellow passenger's cellular phone, and output the telephone conversation signals to the above-mentioned amplifier, which amplifies the telephone conversation voice signals and outputs the amplified telephone conversation voice signals to the above-mentioned fellow passenger's speakers buried in the headrest of the front passenger's seat. Then, the communication units 14 and 14A transmit the signals outputted from the above-mentioned fellow passenger's microphone to the fellow passenger's cellular phone.

By doing this, the fellow passenger who sits in the front passenger's seat 52 can make a hands-free telephone conversation, preventing the driver and another fellow passenger from hearing the telephone conversation voice of the other party of the telephone conversation.

Furthermore, according to the first and second embodiments, each of the front speakers 11*a* and 11*b*, the rear speakers 11*c* and 11*d*, the driver's speakers 11*e*, the microphone 12, the detection unit 13, audio unit 40, and the cellular phone 90 is connected with the control equipment 10, 10A, and 10B. But it is acceptable to connect them to each other by a LAN (Local Area Network), for example, like MOST (Media Oriented System Transport) and so forth installed in the car. Similarly, in the third embodiment, it is acceptable to connect the front speakers 11*a* and 11*b*, the rear speakers 11*c* and 11*d*, the microphone 12, the detection unit 13, audio unit 40, the cellular phone 90, and the control equipment 10C to each other by a LAN (Local Area Network).

Additionally, in the embodiments 1–3, it is acceptable to bury speakers with directional characteristic to the output direction, like the driver's speakers 11*e*, in the front passenger seat 52 and the back seat 53 and to have the speakers output sounds in response to the signals outputted from the amplifier 15*a*. In this case, the output direction of the sounds of each speaker buried in the front passenger seat 52 and the back seat 53 is aimed at the fellow passengers who sit on their seats, and these speakers output the audio sounds based on the audio signals.

By doing this, the individual phonetic spaces are created in each seat, and the fellow passenger can hear the audio sounds like music and so forth in good condition without the obstruction of noise and so forth.

Furthermore, in the embodiments 13, the detection unit 13 comprises the pressure sensors 13*a* and 13*b*. But it is acceptable for the detection unit 13 to be any of the below: an infrared sensor that receives infrared radiation and detects the change of the received infrared radiation; an ultrasound sensor that transmits ultrasound, receives the ultrasound reflected outside, and detects the change of the ultrasound; a temperature sensor that detects the change of the temperature; a selector that switches on and off by the fastening and unfastening of the seatbelts of the front passenger seat 52 and the back seat 53; a camera that is installed to take pictures of the front passenger seat 52 and the back seat 53 and to detect the change of the picture images taken; and a push button switch that switches on and off by the driver's push operation.

Here, in the embodiments 1–3, the cellular phone 90 and the control equipment 10, 10A, 10B, and 10C communicate wirelessly, conforming to the communication standards of Bluetooth ®, but it is acceptable that the cellular phone 90 and the control equipment 10, 10A, 10B, and 10C communicate wirelessly using IEEE 802. 11*a*, IEEE 802. 11*b* (common name "WiFi (Wireless Fidelity)") and Home RF (Home Radio Frequency a.k.a. SWAP (Shared Wireless Access Protocol)) or by cable like Home PNA (Home Phone line Networking Alliance).

Additionally, in the first embodiment, when the car is equipped with a navigation system that guides the driver to destinations and so forth, and the navigation system outputs the guide voice signals indicating the guide voice that do the guiding, it is acceptable to have the control unit 17 of the control equipment 10 and 10A receive the guide voice signals and output to the amplifiers 15*a* and 15*b*. Similarly, in the second and third embodiments, when the above-mentioned navigation system outputs the guide voice signals, it is acceptable to have the control units 17A and 17B of the control equipment 10B and 10C receive the guide voice signals and output to the amplifiers 15*a* and 15*aa*.

By doing this, when the driver makes the status of the navigation system on, the front speakers 11*a* and 11*b* and the rear speakers 11*c* and 11*d* output the guide voice, and therefore the driver can hear the guide voice with good sound quality, and can grasp the guide easily like the destinations and so forth.

Furthermore, in the embodiments 13, it is acceptable to have the cellular phone 90 receive electric mails transmitted by another cellular phone, a personal computer, and so forth, and transmit the mail signals that indicate the writing contents of the electric mail to the control equipment 10, 10A, 10B, and 10C.

In this case, the control equipment 10, 10A, 10B, and 10C include a mail voice signal output unit that creates the mail voice signals that indicate the writing contents of the electric mail by voice based on the mail signals and outputs the mail voice signals. Then, when the communication units 14 and 14A of the control equipment 10, 10A, 10B and 10C receive the above-mentioned mail signals from the cellular phone 90, the communication units 14 and 14A transmit the mail signals to the control units 17, 17A, and 17B, which output the mail signals to the above-mentioned mail voice signal output unit, which inputs the mail signals and then creates the mail voice signals as was stated above and outputs the mail voice signals to the selector switch 16*b*.

By doing this, while there is no fellow passenger, when the cellular phone receives an electric mail, the writing contents of the electric mail are outputted by voice from the front speakers 11*a* and 11*b* and the rear speakers 10*c* and 10*d*, and therefore the driver can hear the voice with good sound quality, and can grasp the writing contents of the electric mail without reading the letters. Additionally, while there is a fellow passenger, when the cellular phone receives an electric mail, the writing contents of the electric mail are outputted by voice from the driver's speakers 11*e*, and therefore the driver hears the voice, grasps the writing contents of the electric mail without reading the letters, and at the same time, makes the voice hard for the fellow passenger to hear.

Furthermore, in the first and second embodiments, when a free-hands telephone conversation is not made, the front speakers 11*a* and 11*b* and the rear speakers 11*c* and 11*d* output the audio sounds like music based on the audio signals, but it is acceptable to output the audio sounds from the two driver's speakers 11*e*.

Similarly, in the first and second embodiments, when the communication units 14 and 14*a* output the incoming call signals, the front speakers 11*a* and 11*b* and the rear speakers 11*c* and 11*d* output the incoming call sounds, but it is acceptable to output the incoming call sounds from the two driver's speakers 11*e*.

What is claimed is:

1. A hands-free device for enabling a driver to have a hands-free telephone conversation using a cellular phone in a car, said hands-free device comprising:

a first speaker operable to output sound to the driver;

a second speaker operable to output sound widely in the car;

a detection unit operable to output a detection signal indicating whether there is a fellow passenger in the car or not; and a control unit operable to communicate with the cellular phone, and operable to judge whether there is a fellow passenger in the car or not based on the detection signal outputted from said detection unit, wherein, when said control unit judges that there is no fellow passenger in the car, upon receiving a telephone conversation voice signal indicating a telephone conversation voice of an other party of the telephone conversation, said control unit is operable to have the telephone conversation voice outputted in a wide range in the car mainly from said second speaker, and restrain the telephone conversation voice to be outputted from said first speaker, and wherein, when said control unit judges that there is a fellow passenger in the car, upon receiving the telephone conversation voice signal indicating the telephone conversation voice of the other party of the telephone conversation, said control unit is operable to have the telephone conversation voice outputted toward the driver mainly from said first speaker, and restrain the telephone conversation voice to be outputted from said second speaker.

2. The hands-free device according to claim 1, wherein said control unit prohibits the telephone conversation from being outputted from the first speaker and outputs the telephone conversation voice from the second speaker when the control unit judges that there is no fellow passenger in the car, and wherein said control unit prohibits the telephone conversation voice from being outputted from the second speaker and outputs the telephone conversation from the first speaker when said control unit judges that there is a fellow passenger in the car.

3. The hands-free device according to claim 1, wherein said control unit has the telephone conversation voice outputted from said first and second speakers in a condition that a sound volume of the second speaker is larger than a sound volume of said first speaker when said control unit judges that there is no fellow passenger in the car, and wherein said control unit has the telephone conversation voice outputted from said first and second speakers in a condition that the sound volume of said first speaker is larger than the sound volume of said second speaker when said control unit judges that there is a fellow passenger in the car.

4. The hands-free device according to claim 1, wherein said first speaker has a directional characteristic that aims an output direction of sound at ears of the driver.

5. The hands-free device according to claim 1, wherein said second speaker is a group of speakers that are installed at a plurality of places in the car and which do not have a directional characteristic of output sound.

6. The hands-free device according to claim 1, wherein said detection unit outputs the detection signal in response to a sitting pressure of the fellow passenger.

7. The hands-free device according to claim 1, wherein said detection unit outputs the detection signal based on a result of detecting a presence of infrared radiation.

8. The hands-free device according to claim 1, wherein said detection unit outputs the detection signal based on a result of acquiring a voice in the car, and judging whether the voice is the driver's voice or another person's voice.

9. The hands-free device according to claim 1, wherein said detection unit is operable to judge whether there is one cellular phone or a plurality of cellular phones located in the car, and wherein said detection unit outputs the detection signal indicating that there is a fellow passenger in the car when it is detected that a plurality of cellular phones are located in the car.

10. The hands-free device according to claim 1, wherein said control unit has an audio sound outputted from said second speaker when an audio signal indicating the audio sound including at least one of music, radio sound, and TV sound is outputted in the car in a case that the telephone conversation voice signals are not received from the cellular phone.

11. The hands-free device according to claim 10, further comprising:

a third speaker that has the directional characteristic of output sound, and is installed on a seat in which the fellow passenger sits with the output direction of sound of the third speaker aimed at ears of the fellow passenger, wherein said control unit has the audio sound outputted from said second and third speakers when the audio signal is outputted in the car in a case that said control unit does not receive the telephone conversation signals from the cellular phone.

12. The hands-free device according to claim 10, comprising a plurality of said second speakers, wherein said control unit prohibits a first one of said second speakers that is nearest to the driver's seat from outputting the audio sound and outputs the audio sound from a second one of said second speakers when the audio signal is outputted in the car in a case that said control unit receives the telephone conversation voice signals.

13. The hands-free device according to claim 1, wherein said control unit communicates with the cellular phone through a wireless communication medium.

14. The hands-free device according to claim 1, wherein said first speaker has an output characteristic of sound that is almost flat at a frequency from about 300 Hz to about 3.4 kHz.

15. The hands-free device according to claim 1, wherein said control unit has said second speaker output an incoming call sound that announces an incoming call when said control unit is informed of an incoming call from the cellular phone.

16. The hands-free device according to claim 1, wherein said first speaker is a thin speaker that is equipped with a diaphragm made of a piezoelectric element and outputs sound by vibrating the diaphragm.

17. The hands-free device according to claim 1, further comprising:

a microphone for the fellow passenger that captures the fellow passenger's voice and outputs a voice signal; and a speaker for the fellow passenger that outputs sound only to the fellow passenger, wherein said control unit further communicates with a fellow passenger's cellular phone, transmits the voice signal to the fellow passenger's cellular phone, and at the same time, has said fellow passenger's speaker output telephone conversation voice of an other party of a telephone conversation of the fellow passenger based on a signal received from the fellow passenger's cellular phone.

18. A hands-free device for enabling a driver to have a hands-free telephone conversation using a cellular phone in a car, said hands-free device comprising:

a speaker operable to output sound widely in the car;

a display unit operable to display a plurality of letters on a display surface aimed at the driver in response to an inputted signal;

a detection unit operable to output a detection signal indicating whether there is a fellow passenger in the car or not; and a control unit operable to communicate with the cellular phone, and operable to judge whether there is a fellow passenger in the car or not based on the detection signal outputted from said detection unit, wherein, when said control unit judges that there is no fellow passenger in the car, upon receiving telephone conversation voice signals indicating a telephone conversation voice of an other party of the telephone conversation, said control unit is operable to have the telephone conversation voice outputted in a wide range in the car from said speaker, and prohibit said display unit from displaying contents of the telephone conversation voice, and wherein, when said control unit judges that there is a fellow passenger in the car, upon receiving telephone conversation voice signals indicating a telephone conversation voice of the other party of the telephone conversation, said control unit is operable to output the telephone conversation voice signals to said display unit so as to have said display unit display, the telephone conversation voice in letters, and restrain the telephone conversation voice to be outputted from said speaker.

19. The hands-free device according to claim 18, further comprising a microphone that captures a voice of the driver and outputs a voice signal indicating the voice of the driver, wherein said control unit transmits the voice signal to the cellular phone when said control unit receives the voice signal from said microphone and, at the same time, erases past letters indicating a contents of the telephone conversation voice of the other party of the telephone conversation displayed on said display unit.

20. The hands-free device according to claim 18, wherein said detection unit outputs the detection signal in response to a sitting pressure of the fellow passenger.

21. The hands-free device according to claim 18, wherein said control unit communicates with the cellular phone through a wireless communication medium.

22. A method for outputting telephone conversation contents in a hands-free system for enabling a driver to have a hands-free telephone conversation using a cellular phone in a car, wherein the hands-free system comprises:

a first speaker operable to output sound to the driver;

a second speaker operable to output sound widely in the car;

a detection unit operable to output a detection signal indicating whether there is a fellow passenger in the car or not; and a control unit operable to communicate with the cellular phone and to control the first and second speakers based on the detection signal outputted from the detection unit, wherein the control unit is operable to execute said method for outputting telephone conversation contents, said method comprising:

receiving a telephone conversation voice signal indicating a telephone conversation voice from an other party of the telephone conversation;

acquiring the detection signal;

judging whether there is a fellow passenger in the car or not based on the acquired detection signal;

outputting the telephone conversation voice in a wide range in the car mainly from the second speaker, and restraining the telephone conversation voice to be outputted from the first speaker, when it is judged that there is no fellow passenger in the car; and outputting the telephone conversation voice toward the driver mainly from the first speaker, and restraining the telephone conversation voice to be outputted from the second speaker, when it is judged that there is a fellow passenger in the car.

23. The method for outputting telephone conversation contents according to claim 22, wherein, when it is judged that there is no fellow passenger in the car, the telephone conversation voice is prohibited from being outputted from the first speaker and is outputted from the second speaker, and wherein, when it is judged that there is a fellow passenger in the car, the telephone conversation voice is prohibited from being outputted from the second speaker and is outputted from the first speaker.

24. The method for outputting telephone conversation contents according to claim 22, wherein when it is judged that there is no fellow passenger in the car, the telephone conversation voice from the first and second speakers is outputted in the condition that the sound volume of the second speaker is larger than the sound volume of the first speaker, and wherein, when it is judged that there is a fellow passenger in the car, the telephone conversation voice from the first and second speakers is outputted in the condition that the sound volume of the first speaker is larger than the sound volume of the second speaker.

25. The method for outputting telephone conversation contents according to claim 22, wherein the method executed by the control unit further comprises:

detecting that an audio signal indicating the audio sound including at least one of music, radio sound, and TV sound is outputted in the car in a case that the telephone conversation voice signal is not received from the cellular phone, and outputting the audio sound from the second speaker based on the audio signal.

26. The method for outputting telephone conversation contents according to claim 25, wherein the hands-free system comprises a plurality of the second speakers, and wherein the method executed by the control unit further comprises:

prohibiting a first one of the second speakers that is nearest to the driver's seat from outputting the audio sound, and outputting audio sound from a second one of the second speakers when the control unit detects that the audio signal is being output when the telephone conversation voice signal is received.

27. A method for outputting telephone conversation contents in a hands-free system for enabling a driver to have a hands-free telephone conversation in a car using a cellular phone, wherein the hands-free system comprises:

a speaker operable to output sound widely in the car;

a display unit operable to display letters in response to inputted signals on a display surface aimed at the driver;

a detection unit operable to output a detection signal indicating whether there is a fellow passenger in the car or not; and a control unit operable to communicate with the cellular phone and control the speaker and the display unit based on the detection signal outputted from the detection unit, wherein the control unit is operable to execute the method for outputting telephone conversation contents, said method comprising:

receiving a telephone conversation voice signal indicating telephone conversation voice from an other party of the telephone conversation;

acquiring the detection signal;

judging whether there is a fellow passenger in the car or not based on the acquired detection signal;

outputting the telephone conversation voice in a wide range in the car from the speaker, and prohibiting the display unit to display the contents of the telephone conversation voice, when it is judged that there is no fellow passenger in the car; and outputting the telephone conversation voice to the display unit so as to have the display unit display the contents of the telephone conversation voice in letters, and restraining the telephone conversation voice to be outputted from the speaker, when it is judged that there is a fellow passenger in the car.

28. The method for outputting telephone conversation contents according to claim 27, wherein the hands-free system further comprises a microphone that captures a voice of the driver and outputs a voice signal indicating the voice of the driver, and wherein the method executed by the control unit further comprises:

receiving the voice signal from the microphone;

transmitting the received voice signal to the cellular phone;

erasing past letters indicating contents of the telephone conversation voice of the other party of the telephone conversation displayed on the display unit.

29. A program stored on a computer-readable medium in a hands-free system for enabling a driver to have a hands-free telephone conversation in a car using a cellular phone, wherein the hands-free system comprises:

a first speaker operable to output sound to the driver;

a second speaker operable to output sound widely in the car;

a detection unit operable to output a detection signal indicating whether there is a fellow passenger in the car or not; and a control unit operable to communicate with the cellular phone and to control the first and second speakers based on the detection signal outputted from the detection unit, wherein the program is executed so as to instruct in the control unit to perform a method comprising:

receiving a telephone conversation voice signal indicating a telephone conversation voice from an other party of the telephone conversation;

acquiring the detection signal;

judging whether there is a fellow passenger in the car or not based on the acquired detection signal ;

outputting the telephone conversation voice in a wide range in the car mainly from the second speaker, and restraining the telephone conversation voice to be outputted from the first speaker, when it is judged in that there is no fellow passenger in the car; and outputting the telephone conversation voice toward the driver mainly from the first speaker, and restraining the telephone conversation voice to be outputted from the second speaker, when it is judged that there is a fellow passenger in the car.

30. The program according to claim 29, wherein, when it is judged that there is no fellow passenger in the car, the telephone conversation voice is prohibited from being outputted from the first speaker and is outputted from the second speaker, and wherein, when it is judged that there is a fellow passenger in the car, the telephone conversation voice is prohibited from being outputted from the second speaker and is outputted from the first speaker.

31. The program according to claim 29, wherein, when it is judged that there is no fellow passenger in the car, the telephone conversation voice from the first and second speakers is outputted in a condition that a sound volume of the second speaker is larger than a sound volume of the first speaker, and wherein when it is judged that there is a fellow passenger in the car, the telephone conversation voice from the first and second speakers is outputted in a the condition that the sound volume of the first speaker is larger than the sound volume of the second speaker.

32. The program according to claim 29, wherein the method executed by the control unit further comprises:

detecting that an audio signal indicating the audio sound including at least one of music, radio sound, and TV sound is outputted in the car in a case that the telephone conversation voice signal is not received from the cellular phone, and outputting the audio sound from the second speaker based on the audio signal.

33. The program according to claim 32, wherein the hands-free system comprises a plurality of the second speakers, and wherein the method executed by the control unit further comprises:

prohibiting a first one of the second speakers that is nearest to the driver's seat from outputting audio sound and outputting audio sound from a second one of the second speakers when the control unit detects that the audio signal is being output when the telephone conversation voice signal is received.

34. A program stored on a computer-readable medium in a hands-free system for enabling a driver to have a hands-free telephone conversation in a car using a cellular phone, wherein the hands-free system comprises:

a speaker operable to output sound widely in the car;

a display unit operable to display letters in response to inputted signals on a display surface aimed at the driver, a detection unit operable to output a detection signal indicating whether there is a fellow passenger in the car or not; and a control unit operable to communicate with the cellular phone and control the speaker and the display unit based on the detection signal outputted from the detection unit, wherein the program is executed so as to instruct the control unit to perform a method comprising:

receiving a telephone conversation voice signal indicating telephone conversation voice from an other party of the telephone conversation;

receiving the telephone conversation voice signal indicating the telephone conversation voice from the other party of the telephone conversation;

acquiring the detection signal;

judging whether there is a fellow passenger in the car or not based on the acquired detection signal;

outputting the telephone conversation voice in a wide range in the car from the speaker, and prohibiting the display unit to display the contents of the telephone conversation voice, when it is judged that there is no fellow passenger in the car; and outputting the telephone conversation voice to the display unit so as to have the display unit display the contents of the telephone conversation voice in letters, and restraining the telephone conversation voice to be outputted from the speaker, when it is judged that there is a fellow passenger in the car.

35. The program according to claim 34, wherein the hands-free system further comprises a microphone that captures a voice of the driver and outputs a voice signal indicating the voice of the driver, and wherein the method executed by the control unit further comprises:

receiving the voice signal from the microphone;

transmitting the received voice signal to the cellular phone;

erasing past letters indicating a contents of the telephone conversation voice of the other party of the telephone conversation displayed on the display unit.

* * * * *